United States Patent
Bell et al.

(10) Patent No.: US 12,534,458 B2
(45) Date of Patent: Jan. 27, 2026

(54) SPIROPIPERIDINE ALLOSTERIC MODULATORS OF NICOTINIC ACETYLCHOLINE RECEPTORS

(71) Applicant: Merck Sharp & Dohme LLC, Rahway, NJ (US)

(72) Inventors: Ian M. Bell, Harleysville, PA (US); Brendan M. Crowley, Collegeville, PA (US); Philippe Nantermet, Lansdale, PA (US)

(73) Assignee: Merck Sharp & Dohme LLC, Rahway, NJ (US)

( * ) Notice: Subject to any disclaimer, the term of this patent is extended or adjusted under 35 U.S.C. 154(b) by 819 days.

(21) Appl. No.: 17/771,527

(22) PCT Filed: Oct. 29, 2020

(86) PCT No.: PCT/US2020/057824
§ 371 (c)(1),
(2) Date: Apr. 25, 2022

(87) PCT Pub. No.: WO2021/091751
PCT Pub. Date: May 14, 2021

(65) Prior Publication Data
US 2022/0396571 A1    Dec. 15, 2022

Related U.S. Application Data

(60) Provisional application No. 62/930,764, filed on Nov. 5, 2019.

(51) Int. Cl.
| | |
|---|---|
| *A61K 31/198* | (2006.01) |
| *A61K 31/445* | (2006.01) |
| *A61K 31/454* | (2006.01) |
| *A61K 31/4545* | (2006.01) |
| *A61K 31/506* | (2006.01) |
| *C07D 221/20* | (2006.01) |
| *C07D 401/04* | (2006.01) |
| *C07D 401/14* | (2006.01) |
| *C07D 413/04* | (2006.01) |
| *C07D 413/14* | (2006.01) |
| *C07D 417/04* | (2006.01) |
| *C07D 417/08* | (2006.01) |
| *A61K 45/06* | (2006.01) |

(52) U.S. Cl.
CPC .......... *C07D 417/08* (2013.01); *A61K 31/454* (2013.01); *A61K 31/4545* (2013.01); *A61K 31/506* (2013.01); *C07D 401/14* (2013.01); *C07D 413/14* (2013.01)

(58) Field of Classification Search
None
See application file for complete search history.

(56) References Cited

U.S. PATENT DOCUMENTS

| | | | |
|---|---|---|---|
| 7,723,391 B2 | 5/2010 | Du Bois et al. | |
| 8,716,309 B2 | 5/2014 | Maeng et al. | |
| 8,765,790 B2 | 7/2014 | Eskildsen et al. | |
| 8,815,914 B2 | 8/2014 | Sams et al. | |
| 2014/0187530 A1 | 7/2014 | Yao et al. | |
| 2020/0115368 A1* | 4/2020 | Martin ................. | C07D 413/14 |

FOREIGN PATENT DOCUMENTS

| | | | |
|---|---|---|---|
| WO | 2009043784 A1 | 4/2009 | |
| WO | WO-2012047703 A2 * | 4/2012 | ........... C07D 221/20 |
| WO | 2012103583 A1 | 8/2012 | |
| WO | 2013007621 A1 | 1/2013 | |
| WO | 2014006117 A1 | 1/2014 | |
| WO | 2014006120 A1 | 1/2014 | |
| WO | 2014019023 A1 | 2/2014 | |
| WO | 2014090731 A1 | 6/2014 | |
| WO | 2017165256 A1 | 9/2017 | |
| WO | WO-2019212927 A1 * | 11/2019 | ........... C07D 471/08 |

OTHER PUBLICATIONS

PubChem 56804578, Mar. 8, 2012 (Year: 2012).*
Eskildsen et al., Discovery and optimization of Lu AF58801, a novel, selective and brain penetrant . . . , Bioorganic & Medicinal Chemistry Letters, 2014, 288-293, 24.
PubChem 56804578, create date, Mar. 8, 2012 (Mar. 8, 2012) p. 2 formula (8 pages).
PubChem CID 153563113, Aug. 13, 2020 (Aug. 13, 2020) p. 2 formula (8 pages).
Sahdeo et al., Characterization of RO5126946, a Novel ALPHA-7 Nicotinic Acetylsholine Receptor-Positive Allosteric Modulator, J. Pharmacol Exp Ther, 2014, 455-468, 350.
Extended European Search Report; 20886145.0; Dated Sep. 21, 2023.

(Continued)

*Primary Examiner* — Kortney L. Klinkel
(74) *Attorney, Agent, or Firm* — Patricia A. Shatynski; John C. Todaro

(57) ABSTRACT

The present disclosure relates to compounds of formula (I) that are useful as modulators of α7 nAChR, compositions comprising such compounds, and the use of such compounds for preventing, treating, or ameliorating disease, particularly disorders of the central nervous system such as cognitive impairments in Alzheimer's disease, Parkinson's disease, and schizophrenia, as well as for L-DOPA induced-dyskinesia and inflammation.

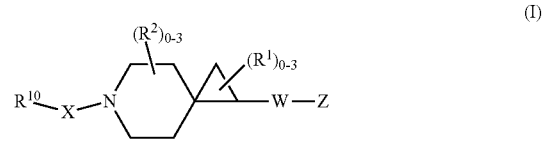

15 Claims, No Drawings

(56) References Cited

OTHER PUBLICATIONS

Database Registry [Online] Chemical Abstracts Service, Columbus, Ohio, US; Mar. 17, 2013, XP002792373, Database accession No. 1424551-29-0 compounds with Registry Nos. 1424551-29-0.
Database Registry [Online] Chemical Abstracts Service, Columbus, Ohio, US; May 19, 2017, XP002792374, Database accession no. 2095972-46-4 compounds with Registry Nos. 2095972-46-4, 2096051-98-6, 2096104-16-2, 2096112-08-0, 2096158-21-1, 2096158-25-5, 2096165-44-3, 2096235-56-0, 2096235-64-0 and 2096280-74-7.
Database Registry [Online] Chemical Abstracts Service, Columbus, Ohio, US; Sep. 28, 2011, XP002792370, Database accession No. 1333571-90-6 compounds with Registry Nos. 1333571-90-6 and 1333607-68-3.
Database Registry [Online] Chemical Abstracts Service, Columbus, Ohio, US; Sep. 29, 2011, XP002792371, Database accession No. 1333782-86-7 compounds with Registry Nos. 1333782-86-7, 1333802-73-5, 1333809-40-7, 1333812-96-6, 1333844-27-1, 1333903-90-4 and 1334014-80-0.
Database Registry [Online] Chemical Abstracts Service, Columbus, Ohio, US; Mar. 6, 2018, XP002792375, Database accession No. 2185091-40-9 compounds with Registry Nos. 2185091-40-9, 2185107-01-9, 2185107-05-3, 2185147-37-7 and 2185160-46-5.
Database Registry [Online] Chemical Abstracts Service, Columbus, Ohio, US; Jul. 7, 2011, XP002792369, Database accession No. 1311654-00-8 compounds with Registry Nos. 1311654-00-8, 1311670-59-3, 1311732-82-7 and 1311864-00-2.
Database Registry [Online] Chemical Abstracts Service, Columbus, Ohio, US; Feb. 14, 2012, XP002792372, Database accession No. 1356558-70-7 compounds with Registry Nos. 1356558-70-7, 1356559-97-1, 1356560-75-2, 1356566-96-5, 1356574-08-7, 1356574-11-2, 1356579-11-7, 1356629-51-0, 1356630-19-7, 1356641-27-4.

* cited by examiner

SPIROPIPERIDINE ALLOSTERIC MODULATORS OF NICOTINIC ACETYLCHOLINE RECEPTORS

CROSS REFERENCE TO RELATED APPLICATIONS

This application is a U.S. National Phase application under 35 U.S.C. § 371 of PCT Application No. PCT/US20/057824, filed Oct. 29, 2020 which claims priority under 35 U.S.C. § 119(e) from U.S. Provisional Application Ser. No. 62/930,764, filed on Nov. 5, 2019.

FIELD OF THE INVENTION

The present disclosure relates to compounds that are useful as modulators of α7 nAChR, compositions comprising such compounds, and the use of such compounds for preventing, treating, or ameliorating disease, particularly disorders of the central nervous system such as cognitive impairments in Alzheimer's disease, Parkinson's disease, and schizophrenia.

BACKGROUND OF THE INVENTION

The α7 nAChR is a fast desensitizing ligand-gated ion channel that has high permeability to $Ca^{2+}$. In human brain, α7 nAChRs are highly expressed in the cortex and hippocampus, regions associated with cognition, see for example, Breese et al. *J. Comp. Neurol.* (1997) 387:385-398. In neurons, α7 nAChRs are localized in both pre-synaptic and post-synaptic structures, where activation of the receptor can modulate neurotransmitter release, neuronal excitability, and intracellular signalling, see for example, Frazier et al. *J. Neurosci.* (1998) 18:1187-1195.

Cognitive impairments are prevalent in many neurological and psychiatric diseases, including Alzheimer's disease (AD), schizophrenia, and Parkinson's disease, and dysfunction in cholinergic signalling contributes to the cognitive impairments of these diseases, see for example, Francis et al. *J. Neurol. Neurosurg. Psychiatry* (1999) 66:137-147. For example, a principal feature of the pathogenesis in AD is the loss of cholinergic neurons in the basal forebrain nuclei, whereas increasing cholinergic transmission via inhibition of acetylcholine esterase is the standard of care for the cognitive symptoms of AD. More specific to the α7 nAChR, it was recently demonstrated that encenicline, a partial agonist of the α7 nAChR, improves cognition in Alzheimer's disease, see for example, Moebius H et al., $67^{th}$ *Annual Meeting. Am. Acad. Neurol.* (AAN) 2015, Abst P 7.100. Evidence implicating α7 nAChRs in the etiology of schizophrenia comes from studies demonstrating reduced expression of neuronal α7 nAChRs in the brain of schizophrenic patients and the observation that schizophrenics frequently smoke, which is believed to be a form of self-medication. In addition, variants in the promotor region of the gene coding for the α7 nAChR, CHRNA7, which impacts expression of the α7 nAChR protein, are associated with symptoms of schizophrenia, see for example, Sinkus et al. *Neuropharmacology* (2015) 96:274-288. Moreover, accumulating evidence from clinical trials has indicated that activating α7 nAChR with agonists may have beneficial effects on cognition, see for example, Keefe et al. *Neuropsychopharmacology* (2015) 40:3053-3060 and Bertrand et al. *Pharmacology Reviews* (2015) 67:1025-1073. Therefore, targeting the α7 nAChR represents a therapeutic strategy for the treatment of cognitive impairments associated with various cognitive disorders.

Parkinson's disease (PD) is a neurodegenerative disease characterized by progressive deficits in motor function, such as tremor, bradykinesia, rigidity and impaired postural reflex. The main pathological finding associated with the disease is degeneration of dopaminergic neurons in the substantia nigra, resulting in loss of dopaminergic tone in the striatum. L-DOPA is the current standard treatment for the motor symptoms in PD. However, chronic treatment with L-DOPA in PD patients also induces dyskinesia, a side effect of L-DOPA therapy. New lines of evidence indicate that activating α7 nAChRs acutely alleviates dyskinesia in several animal models, see for example, Zhang et al. *J. Pharmacol. Exp. Ther.* (2014) 351:25-32. In addition, accumulating evidence shows that pretreatment with α7 nAChR agonists may protect against neurodegeneration in nigrostriatal neurons, suggesting α7 activation may have disease modifying properties too, see for example, Suzuki et al. *J. Neurosci. Res.* (2013) 91:462-471. Overall, α7 nAChR is an attractive target for both ameliorating disease progression and managing dyskinesia.

In addition to its expression in the central nervous system, the α7 nAChR is widely expressed in peripheral immune cells including macrophage, monocytes, dendritic cells, and B and T cells, see for example, Rosas-Ballina et al. *Science* (2011) 334:98-101. Activation of peripheral α7 nAChRs is critical for inhibiting the release of proinflammatory cytokines via the cholinergic anti-inflammatory pathway, see for example, Wang et al. *Nature* (2003) 421:384-388. Therefore, α7 nAChR is a potential target for several inflammatory diseases such as rheumatoid arthritis, and atherosclerosis, see for example, W J de Jonge et al. *British J. Pharmacol.* (2007) 151:915-929.

Cough is one of the most common symptoms for which patients seek medical attention. Chronic cough, defined as a cough of greater than 8 weeks of duration, is a clinical syndrome with distinct intrinsic pathophysiology characterized by neuronal hypersensitivity. Current treatment for chronic cough consists of antitussive therapy to decrease cough frequency or severity. However, the available antitussives have limited efficacy and their utility is further restricted by safety and abuse liabilities. Recent studies performed in healthy human volunteers indicate that activation of nAChR may represent a novel, safe, and effective antitussive strategy, see for example, Davenport et al. *Pulm. Pharmacol. Ther.* (2009) 22:82-89; Dicpinigaitis. *Pulm. Pharmacol. Ther.* (2017) 47:45-48. Furthermore, pre-clinical studies suggest that α7 nAChR is likely the target for antitussive nAChR ligands, see for example, Canning et al. *Am. J. Respir. Crit. Care. Med.* (2017) 195:A4498. Therefore, targeting α7 nAChR represents an attractive antitussive strategy in patients with cough.

In recent years, α7-selective positive allosteric modulators (PAMs) have been proposed as a therapeutic approach to treating cognitive impairments in AD, PD, and schizophrenia, as well as L-DOPA induced-dyskinesia, inflammation, and cough. In contrast to α7 agonists that activate the channel irrespective of endogenous agonist, PAMs increase the potency of the endogenous agonist without perturbing the temporal and spatial integrity of neurotransmission. There are two classes of α7 PAMs, type I and type II, which differ based on the functional properties of modulation. The type I PAMs (e.g. NS1738, see for example, Timmermann et al. *J. Pharmacol. Exp. Ther.* (2007) 323:294-307) predominantly affect the peak current with little or no effect on receptor desensitization, while the type II PAMs (e.g. PNU120596, see for example, Hurst et al. *J. Neurosci.* (2005) 25:4396-4405) markedly delay desensitization of the receptor. Additionally, α7 nAChR PAMs may have improved selectivity over related channel targets, presumably through binding to non-conserved regions of the receptor.

The present invention is directed to a new class of compounds that exhibit positive allosteric modulation of the α7 nAChR.

SUMMARY OF THE INVENTION

The present disclosure relates to novel compounds of formula I and pharmaceutically acceptable salts thereof. These compounds may be useful, either as compounds or their pharmaceutically acceptable salts (when appropriate), in the modulation of the α7 nAChR, the prevention, treatment, or amelioration of disease, particularly disorders of the central nervous system such as cognitive impairments in Alzheimer's disease, Parkinson's disease, and schizophrenia and/or as pharmaceutical composition ingredients. As pharmaceutical composition ingredients, these compounds and their salts may be the primary active therapeutic agent, and, when appropriate, may be combined with other therapeutic agents including but not limited to acetylcholinesterase inhibitors, NMDA receptor antagonists, beta-secretase inhibitors, M4 mAChR agonists or PAMs, mGluR2 antagonists or NAMs or PAMs, 5-HT6 antagonists, histamine H3 receptor antagonists, PDE4 inhibitors, PDE9 inhibitors, HDAC6 inhibitors, antipsychotics, MAO-B inhibitors, and levodopa.

In one aspect, the present invention relates to a compound of formula I:
relates to a compound of formula I:

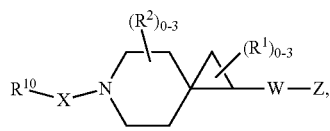
(I)

or a pharmaceutically acceptable salt thereof, wherein:
W is aryl or 6-14 membered heteroaryl ring, wherein W is substituted with 0, 1, 2, or 3 $R^3$ substituents each independently selected from OH, oxo, $NR^6R^7$, CN, $O(C_1-C_6)$alkyl, halogen, $(C_1-C_6)$haloalkyl, aminoalkyl, hydroxyalkyl, alkyl, alkenyl, alkynyl, cycloalkyl, aryl, heteroaryl, and heterocyclyl, wherein each $R^3$ is independently substituted with 0, 1, 2, or 3 $R^5$;
Z is hydrogen, $(C_1-C_6)$alkyl, aryl, or heteroaryl, wherein Z is substituted with 0, 1, 2, or 3 $R^4$ substituents each independently selected from OH, oxo, $NR^6R^7$, CN, $O(C_1-C_6)$alkyl, halogen, $(C_1-C_6)$haloalkyl, aminoalkyl, hydroxyalkyl, alkyl, alkenyl, alkynyl, cycloalkyl, aryl, heteroaryl, and heterocyclyl, wherein each $R^4$ is independently substituted with 0, 1, 2, or 3 $R^5$;
X is $S(O)_2$ or $C(O)$;
$R^{10}$ is selected from $NR^aR^b$ and $R^c$;
$R^a$ is selected from H, $(C_1-C_4)$alkyl, $(C_3-C_6)$cycloalkyl, aryl, heteroaryl, and heterocyclyl, said alkyl, cycloalkyl, aryl, heteroaryl and heterocyclyl are optionally substituted with one or more substituents independently selected from $R^{11}$;
$R^b$ is H or $(C_1-C_4)$alkyl;
$R^c$ is $(C_1-C_4)$alkyl, wherein said alkyl is optionally substituted with $R^{12}$; or $R^c$ is heteroaryl, wherein said heteroaryl is optionally substituted with one or more $R^{13}$;
$R^{11}$ is OH, $(C_1-C_4)$alkyl, aryl, heteroaryl, or heterocyclyl;
$R^{12}$ is aryl, heteroaryl, or heterocyclyl;
$R^{13}$ is methyl or hydroxyl;
each $R^2$ is independently halogen, $(C_1-C_6)$alkyl, $O(C_1-C_6)$alkyl, cycloalkyl, or $(C_1-C_6)$haloalkyl; or two $R^2$ when both are $(C_1-C_4)$alkyl and are attached to the same carbon atom, may join to form a cyclopropyl, cyclobutyl, or cyclopentyl ring or, two $R^2$ when both are $(C_1-C_4)$alkyl and are attached to different carbon atoms, may join to form a bridged ring, wherein said cyclopropyl, cyclobutyl, cyclopentyl or bridged ring may be optionally substituted with 0, 1, 2, or 3 substituents independently selected from OH, halogen, or $(C_1-C_4)$alkyl;
each $R^1$ is independently halogen, $(C_1-C_6)$alkyl, $O(C_1-C_6)$alkyl, or $(C_1-C_6)$haloalkyl; or, two $R^1$ when both are $(C_1-C_4)$alkyl may join to form a cyclopropyl, cyclobutyl, cyclopentyl, or cyclohexyl ring and said ring is substituted with 0, 1, 2, or 3 substituents independently selected from OH, halogen, or $(C_1-C_4)$alkyl;
each $R^5$ is independently selected from halogen, OH, oxo, $CF_3$, $OCF_3$, CN, $(C_1-C_6)$alkyl, $O(C_1-C_6)$alkyl, $S(C_1-C_4)$alkyl, $C=O(C_1-C_4)$alkyl, $NR^8R^9$, $(C=O)NR^6R^7$, $(C=O)OR^6$, $(C_2-C_4)$alkenyl, $(C_2-C_4)$alkynyl, $(C_3-C_6)$cycloalkyl, $O(C_3-C_6)$cycloalkyl, $C=O(C_3-C_6)$cycloalkyl, aryl, O-aryl, heteroaryl and heterocyclyl;
each $R^6$ is independently hydrogen or $(C_1-C_4)$alkyl;
each $R^7$ is independently hydrogen or $(C_1-C_4)$alkyl;
each $R^8$ is independently $(C_1-C_4)$alkyl, heterocyclyl, cycloalkyl, heteroaryl, aryl, or $(C=O)R^6$, each substituted with 0, 1, 2, or 3 substituents independently selected from halogen, $(C_1-C_4)$alkyl, and OH; and
each $R^9$ is independently $(C_1-C_4)$alkyl, heterocyclyl, cycloalkyl, heteroaryl, aryl, or $(C=O)R^6$, each substituted with 0, 1, 2, or 3 substituents independently selected from halogen, $(C_1-C_4)$alkyl, and OH.

The present invention also includes pharmaceutical compositions containing a compound of the present invention and methods of preparing such pharmaceutical compositions. The present invention further includes methods of preventing, treating, or ameliorating the cognitive impairments associated with Alzheimer's disease, Parkinson's disease, and schizophrenia.

Other embodiments, aspects and features of the present invention are either further described in or will be apparent from the ensuing description, examples and appended claims.

DETAILED DESCRIPTION OF THE INVENTION

The present invention includes compounds of formula I above, and pharmaceutically acceptable salts thereof. The compounds of formula I are positive allosteric modulators of α7 nAChR.

In a first embodiment of the invention, W is aryl wherein W is substituted with 0, 1, 2, or 3 $R^3$ substituents each independently selected from OH, oxo, $NR^6R^7$, CN, $O(C_1-C_6)$alkyl, halogen, $(C_1-C_6)$haloalkyl, aminoalkyl, hydroxyalkyl, alkyl, alkenyl, alkynyl, cycloalkyl, aryl, heteroaryl, and heterocyclyl, wherein each $R^3$ is independently substituted with 0, 1, 2, or 3 $R^5$; and the other groups are as provided in the general formula above.

In a second embodiment of the invention, W is 6-14 membered heteroaryl ring, wherein W is substituted with 0, 1, 2, or 3 $R^3$ substituents each independently selected from OH, oxo, $NR^6R^7$, CN, $O(C_1-C_6)$alkyl, halogen, $(C_1-C_6)$ haloalkyl, aminoalkyl, hydroxyalkyl, alkyl, alkenyl, alkynyl, cycloalkyl, aryl, heteroaryl, and heterocyclyl, wherein each $R^3$ is independently substituted with 0, 1, 2, or 3 $R^5$; and the other groups are as provided in the general formula above.

In a third embodiment of the invention, W is selected from phenyl, napthyl, benzimidazolyl, benzimidazolonyl, benzofuranyl, benzofurazanyl, benzopyrazolyl, benzotriazolyl, benzothiophenyl, benzoxazolyl, benzothiazolyl, carbazolyl, carbolinyl, cinnolinyl, indolinyl, indolyl, indolazinyl, indazolyl, isobenzofuranyl, isoindolyl, isoquinolyl, naphthpyridinyl, pyrazinyl, pyridazinyl, pyridopyridinyl, pyridazinyl, pyridyl, pyrimidyl, quinazolinyl, quinolyl, quinoxalinyl, tetrazolopyridyl, dihydrobenzoimidazolyl, dihydrobenzofuranyl, dihydrobenzothiophenyl, dihydrobenzoxazolyl, dihydroindolyl, dihydroquinolinyl, tetrahydrobenzoxazolyl, oxazolopyridinyl, imidazopyridazinyl, dihydrocyclopentaoxazolyl, pyrazolopyridinyl, thienopyridinyl, tetrahydropyrazolopyridinyl, furopyridinyl, dihydropyridooxazinyl, dihydrobenzothiazolyl, tetrahydrobenzothiazolyl, thiazolopyridinyl, pyridopyrimidinyl, phthalazinyl, pyridopyrazinyl, thienoxazolyl, and thienothiazolyl, wherein W is substituted with 0, 1, 2, or 3 $R^3$ substituents each independently selected from OH, oxo, $NR^6R^7$, CN, $O(C_1-C_6)$alkyl, halogen, $(C_1-C_6)$haloalkyl, aminoalkyl, hydroxyalkyl, alkyl, alkenyl, alkynyl, cycloalkyl, aryl, heteroaryl, and heterocyclyl, wherein each $R^3$ is independently substituted with 0, 1, 2, or 3 $R^5$; and the other groups are as provide in the general formula above.

In a fourth embodiment of the invention, W is benzoxazolyl, benzothiazolyl, pyridyl, or pyrimidyl, wherein W is substituted with 0, 1, 2, or 3 $R^3$ substituents each independently selected from OH, oxo, $NR^6R^7$, CN, $O(C_1-C_6)$alkyl, halogen, $(C_1-C_6)$haloalkyl, aminoalkyl, hydroxyalkyl, alkyl, alkenyl, alkynyl, cycloalkyl, aryl, heteroaryl, and heterocyclyl, wherein each $R^3$ is independently substituted with 0, 1, 2, or 3 $R^5$; and the other groups are as provided in the general formula above.

In a fifth embodiment of the invention, Z is hydrogen, aryl, or heteroaryl, wherein Z is substituted with 0, 1, 2, or 3 $R^4$ substituents each independently selected from OH, oxo, $NR^6R^7$, CN, $O(C_1-C_6)$alkyl, halogen, $(C_1-C_6)$haloalkyl, aminoalkyl, hydroxyalkyl, alkyl, alkenyl, alkynyl, cycloalkyl, aryl, heteroaryl, and heterocyclyl, wherein each $R^4$ is independently substituted with 0, 1, 2, or 3 $R^5$; and the other groups are provided in the general formula above, or as in the first through fourth embodiments.

In a sixth embodiment of the invention, Z is hydrogen or $(C_1-C_6)$alkyl, wherein Z is substituted with 0, 1, 2, or 3 $R^4$ substituents each independently selected from OH, oxo, $NR^6R^7$, CN, $O(C_1-C_6)$alkyl, halogen, $(C_1-C_6)$haloalkyl, aminoalkyl, hydroxyalkyl, alkyl, alkenyl, alkynyl, cycloalkyl, aryl, heteroaryl, and heterocyclyl, wherein each $R^4$ is independently substituted with 0, 1, 2, or 3 $R^5$; and the other groups are provided in the general formula above, or as in the first through fourth embodiments.

In a seventh embodiment of the invention, Z is selected from phenyl, napthyl, benzimidazolyl, benzimidazolonyl, benzofuranyl, benzofurazanyl, benzopyrazolyl, benzothiazolyl, benzotriazolyl, benzothiophenyl, benzoxazolyl, carbazolyl, carbolinyl, cinnolinyl, furanyl, imidazolyl, indolinyl, indolyl, indolazinyl, indazolyl, isobenzofuranyl, isoindolyl, isoquinolyl, isothiazolyl, isoxazolyl, naphthpyridinyl, oxadiazolyl, oxazolyl, pyrazinyl, pyrazolyl, pyridazinyl, pyridopyridinyl, pyridazinyl, pyridyl, pyrimidyl, pyrrolyl, quinazolinyl, quinolyl, quinoxalinyl, tetrazolyl, tetrazolopyridyl, thiadiazolyl, thiazolyl, thienyl, triazolyl, dihydrobenzoimidazolyl, dihydrobenzofuranyl, dihydrobenzothiophenyl, dihydrobenzoxazolyl, dihydroindolyl, dihydroquinolinyl, methylenedioxybenzoyl, tetrahydroisoquinolyl, and tetrahydroquinolyl, wherein Z is substituted with 0, 1, 2, or 3 $R^4$ substituents each independently selected from OH, oxo, $NR^6R^7$, CN, $O(C_1-C_6)$alkyl, halogen, $(C_1-C_6)$ haloalkyl, aminoalkyl, hydroxyalkyl, alkyl, alkenyl, alkynyl, cycloalkyl, aryl, heteroaryl, and heterocyclyl, wherein each $R^4$ is independently substituted with 0, 1, 2, or 3 $R^5$; and the other groups are provided in the general formula above, or as in the first through fourth embodiments.

In an eighth embodiment of the invention, Z is hydrogen, phenyl, isoxazolyl, benzoxazolyl, or pyrazolyl, wherein Z is substituted with 0, 1, 2, or 3 $R^4$ substituents each independently selected from OH, oxo, $NR^6R^7$, CN, $O(C_1-C_6)$alkyl, halogen, $(C_1-C_6)$haloalkyl, aminoalkyl, hydroxyalkyl, alkyl, alkenyl, alkynyl, cycloalkyl, aryl, heteroaryl, and heterocyclyl, wherein each $R^4$ is independently substituted with 0, 1, 2, or 3 $R^5$; and the other groups are provided in the general formula above, or as in the first through fourth embodiments.

In a ninth embodiment of the invention, each $R^1$ is independently halogen, $(C_1-C_6)$alkyl, $O(C_1-C_6)$alkyl, or $(C_1-C_6)$haloalkyl; and the other groups are provided in the general formula above, or as in the first through eighth embodiments.

In tenth embodiment of the invention, each $R^1$ is independently F, Cl, methyl, trifluoromethyl, difluoromethyl, methoxy, or ethoxy; and the other groups are provided in the general formula above, or as in the first through eighth embodiments.

In an eleventh embodiment of the invention, $R^1$ is F; and the other groups are provided in the general formula above, or as in the first through eighth embodiments.

In a twelfth embodiment of the invention, each $R^2$ is independently halogen, $(C_1-C_6)$alkyl, or $O(C_1-C_6)$alkyl; and the other groups are provided in the general formula above, or as in the first through eleventh embodiments.

In a thirteenth embodiment, each $R^2$ is independently methyl, ethyl or F; and the other groups are provided in the general formula above, or as in the first through eleventh embodiments.

In a fourteenth embodiment of the invention, each $R^3$ is independently selected from OH, oxo, CN, $O(C_1-C_6)$alkyl, halogen, $(C_1-C_6)$haloalkyl, hydroxyalkyl, alkyl, cycloalkyl, aryl, heteroaryl, and heterocyclyl, wherein each $R^3$ is independently substituted with 0, 1, 2, or 3 $R^5$; and the other groups are provided in the general formula above, or as in the first through thirteenth embodiments.

In a fifteenth embodiment of the invention, each $R^3$ is independently selected from halogen, trifluoromethyl, hydroxyalkyl, methyl, cyclopropyl, wherein each $R^3$ is independently substituted with 0, 1, 2, or 3 $R^5$; and the other groups are provided in the general formula above, or as in the first through thirteenth embodiments.

In a sixteenth embodiment of the invention, each $R^4$ is independently selected from OH, oxo, $NR^6R^7$, CN, $O(C_1-C_6)$alkyl, halogen, $(C_1-C_6)$haloalkyl, aminoalkyl, hydroxyalkyl, alkyl, alkenyl, alkynyl, cycloalkyl, aryl, heteroaryl, and heterocyclyl, wherein each $R^4$ is independently substituted with 0, 1, 2, or 3 $R^5$; and the other groups are provided in the general formula above, or as in the first through fifteenth embodiments.

In a seventeenth embodiment of the invention, each $R^4$ is independently selected from halogen, trifluoromethyl, hydroxyalkyl, methyl, cyclopropyl, wherein each $R^4$ is independently substituted with 0, 1, 2, or 3 $R^5$; and the other groups are provided in the general formula above, or as in the first through fifteenth embodiments.

In an eighteenth embodiment of the invention, each $R^5$ is independently selected from halogen, OH, oxo, $CF_3$, $OCF_3$, methyl, ethyl, difluoromethyl, and trifluoromethyl; and the other groups are provided in the general formula above, or as in the first through seventeenth embodiments.

In a nineteenth embodiment of the invention, each $R^6$ is hydrogen, methyl, or ethyl; and the other groups are provided in the general formula above, or as in the first through eighteenth embodiments.

In a twentieth embodiment of the invention, each $R^6$ is hydrogen; and the other groups are provided in the general formula above, or as in the first through eighteenth embodiments.

In a twenty-first embodiment of the invention, each $R^7$ is hydrogen, methyl, or ethyl; and the other groups are provided in the general formula above, or as in the first through twentieth embodiments.

In a twenty-second embodiment of the invention, each $R^7$ is hydrogen; and the other groups are provided in the general formula above, or as in the first through twentieth embodiments.

In a twenty-third embodiment of the invention, each $R^8$ is $(C_1$-$C_4)$alkyl; and the other groups are provided in the general formula above, or as in the first through twenty-second embodiments.

In a twenty-fourth embodiment of the invention, each $R^9$ is $(C_1$-$C_4)$alkyl; and the other groups are provided in the general formula above, or as in the first through twenty-third embodiments.

In a twenty-fifth embodiment of the invention, —X—$R^1$ is

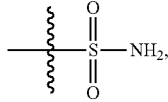 [SMILES: *S(N)(=O)=O]

and the other groups are as provided in the general formula above or as in the first through twenty-fourth embodiments.

In a twenty-sixth embodiment of the invention, each $R^2$ is independently fluoro or chloro and the other groups are as provided in the general formula above, or as in the first through twelfth or fourteenth through twenty-fifth embodiment.

In another embodiment of formula I, X is $S(O)_2$.
In another embodiment of formula I, X is C(O).
In another embodiment of formula I, $R^{10}$ is $NR^aR^b$.
In another embodiment of formula I, $R^{10}$ is $R^c$.
In another embodiment of formula I, $R^a$ is H, $(C_1$-$C_4)$alkyl, or $(C_3$-$C_6)$cycloalkyl, wherein said alkyl is optionally substituted with phenyl, pyridinyl, or isothiazolyl.
In another embodiment of formula I, $R^a$ is H or $(C_1$-$C_4)$alkyl.
In another embodiment of formula I, $R^a$ is H or methyl.
In another embodiment of formula I, $R^a$ is H.
In another embodiment of formula I, $R^b$ is H or methyl.

In another embodiment of formula I, $R^b$ is H.
In another embodiment of formula I, $R^c$ is $(C_1$-$C_4)$alkyl, thienyl, pyrazolyl, benzoxadiazolyl, benzothiazolyl, or oxadiazolyl, wherein said thienyl, pyrozolyl, benzoxadiazolyl, and oxadiazolyl are optionally substituted with one or more methyl or hydroxyl, and wherein said alkyl is optionally substituted with pyridinyl, tetrahydropyranyl, isothiazolyl, or phenyl.
In another embodiment of formula I, $R^c$ is methyl.
In another embodiment of formula I, —X—$R^{10}$ is —(C=O)—$R^{10}$.
In one embodiment of the invention, $R^1$ is halogen, or $(C_1$-$C_4)$alkyl.
In another embodiment, $R^2$ is halogen, or $(C_1$-$C_4)$alkyl.
In one embodiment of the invention, each $R^8$ is independently selected from $(C_1$-$C_4)$alkyl, heterocyclyl, cycloalkyl, heteroaryl, aryl, and (C=O)$R^6$, each $R^8$ is substituted with 0, 1, 2, or 3 substituents independently selected from halogen, $(C_1$-$C_4)$alkyl, and OH.
In one embodiment of the invention, each $R^9$ is independently $(C_1$-$C_4)$alkyl or (C=O)$R^6$, each $R^{9\ is}$ substituted with 0, 1, 2, or 3 substituents independently selected from halogen, $(C_1$-$C_4)$alkyl, and OH.

Representative compounds of the present invention are as follows, where each named compound is intended to encompass its individual isomers, mixtures thereof (including racemates and diastereomeric mixtures), as well as pharmaceutically acceptable salts thereof:
1-(1,3-Benzothiazol-2-yl)-6-azaspiro[2.5]octane-6-sulfonamide;
1,1-Difluoro-2-(6-phenylpyridin-2-yl)-6-azaspiro[2.5]octane-6-sulfonamide;
1-(6-Phenylpyridin-2-yl)-6-azaspiro[2.5]octane-6-sulfonamide;
1,1-Difluoro-2-(4-phenylpyrimidin-2-yl)-6-azaspiro[2.5]octane-6-sulfonamide;
1,1-Difluoro-2-{6-[4-(trifluoromethyl)phenyl]pyridin-2-yl}-6-azaspiro[2.5]octane-6-sulfonamide;
1,1-Difluoro-2-[6-(2-methylphenyl)pyridin-2-yl]-6-azaspiro[2.5]octane-6-sulfonamide;
1,1-Difluoro-2-(4-phenylpyridin-2-yl)-6-azaspiro[2.5]octane-6-sulfonamide;
2-[6-(2-Cyclopropylphenyl)pyridin-2-yl]-1,1-difluoro-6-azaspiro[2.5]octane-6-sulfonamide;
2-(1,3-Benzoxazol-2-yl)-1,1-difluoro-6-azaspiro[2.5]octane-6-sulfonamide;
1,1-Difluoro-2-{6-[4-(trifluoromethyl)phenyl]pyridin-2-yl}-6-azaspiro[2.5]octane-6-sulfonamide;
1,1-Difluoro-2-(4-phenylpyridin-2-yl)-6-azaspiro[2.5]octane-6-sulfonamide;
1,1-Difluoro-2-[3'-(trifluoromethyl)biphenyl-3-yl]-6-azaspiro[2.5]octane-6-sulfonamide;
2-[6-(3-Cyclopropylisoxazol-4-yl)pyridin-2-yl]-1,1-difluoro-6-azaspiro[2.5]octane-6-sulfonamide;
2-[6-(3-Cyclopropylisoxazol-4-yl)pyridin-2-yl]-1,1-difluoro-6-azaspiro[2.5]octane-6-sulfonamide; or
2-{6-[1-Cyclopropyl-3-(trifluoromethyl)-1H-pyrazol-5-yl]pyridin-2-yl}-1,1-difluoro-6-azaspiro[2.5]octane-6-sulfonamide.

One embodiment of the invention is directed to a compound, or a pharmaceutically acceptable salt thereof, selected from the following exemplified compounds:
(1R)-1-(1,3-Benzothiazol-2-yl)-6-azaspiro[2.5]octane-6-sulfonamide;
1,1-Difluoro-2-(6-phenylpyridin-2-yl)-6-azaspiro[2.5]octane-6-sulfonamide;

1-(6-Phenylpyridin-2-yl)-6-azaspiro[2.5]octane-6-sulfonamide;

(2R)-1,1-Difluoro-2-(4-phenylpyrimidin-2-yl)-6-azaspiro[2.5]octane-6-sulfonamide;

(2R)-1,1-Difluoro-2-{6-[4-(trifluoromethyl)phenyl]pyridin-2-yl}-6-azaspiro[2.5]octane-6-sulfonamide;

(2R)-1,1-Difluoro-2-[6-(2-methylphenyl)pyridin-2-yl]-6-azaspiro[2.5]octane-6-sulfonamide;

(2R)-1,1-Difluoro-2-(4-phenylpyridin-2-yl)-6-azaspiro[2.5]octane-6-sulfonamide;

(2R)-2-[6-(2-Cyclopropylphenyl)pyridin-2-yl]-1,1-difluoro-6-azaspiro[2.5]octane-6-sulfonamide;

(2R)-2-(1,3-Benzoxazol-2-yl)-1,1-difluoro-6-azaspiro[2.5]octane-6-sulfonamide;

(2S)-1,1-Difluoro-2-{6-[4-(trifluoromethyl)phenyl]pyridin-2-yl}-6-azaspiro[2.5]octane-6-sulfonamide;

(2S)-1,1-Difluoro-2-(4-phenylpyridin-2-yl)-6-azaspiro[2.5]octane-6-sulfonamide;

1,1-Difluoro-2-[3'-(trifluoromethyl)biphenyl-3-yl]-6-azaspiro[2.5]octane-6-sulfonamide;

2-[6-(3-Cyclopropylisoxazol-4-yl)pyridin-2-yl]-1,1-difluoro-6-azaspiro[2.5]octane-6-sulfonamide;

2-[6-(3-Cyclopropylisoxazol-4-yl)pyridin-2-yl]-1,1-difluoro-6-azaspiro[2.5]octane-6-sulfonamide; or 2-{6-[1-Cyclopropyl-3-(trifluoromethyl)-1H-pyrazol-5-yl]pyridin-2-yl}-1,1-difluoro-6-azaspiro[2.5]octane-6-sulfonamide.

Other embodiments of the present invention include the following:

(a) A pharmaceutical composition comprising a compound of formula I and a pharmaceutically acceptable carrier.

(b) The pharmaceutical composition of (a), further comprising a second therapeutic agent selected from the group consisting of acetylcholinesterase inhibitors such as donepezil, rivastigmine, and galantamine; NMDA receptor antagonists such as memantine; beta-secretase inhibitors such as verubecestat, and AZD3293; M4 mAChR agonists or PAMs; mGluR2 antagonists or NAMs or PAMs; 5-HT6 antagonists such as idalopirdine, RVT-101, AVN-101, AVN322, SUVN-502, and SYN-120; histamine H3 receptor antagonists such as S38093; PDE4 inhibitors such as HT0712; PDE9 inhibitors such as BI40936; HDAC6 inhibitors; antipsychotics; LRRK2 inhibitors; MAO-B inhibitors; and levodopa.

(c) The pharmaceutical composition of (b), wherein the second therapeutic agent is an antipsychotic selected from the group consisting of clozapine, olanzapine, risperidone, aripiprazole, quetiapine, haloperidol, loxapine, thioridazine, molindone, thiothixene, fluphenazine, mesoridazine, trifluoperazine, chlorpromazine, and perphenazine.

(d) A pharmaceutical combination that is (i) a compound of formula I and (ii) a second therapeutic agent selected from the group consisting of acetylcholinesterase inhibitors such as donepezil, rivastigmine, and galantamine; NMDA receptor antagonists such as memantine; beta-secretase inhibitors such as verubecestat, and AZD3293; M4 mAChR agonists or PAMs; mGluR2 antagonists or NAMs or PAMs; 5-HT6 antagonists such as idalopirdine, RVT-101, AVN-101, AVN322, SUVN-502, and SYN-120; histamine H3 receptor antagonists such as S38093; PDE4 inhibitors such as HT0712; PDE9 inhibitors such as BI40936; HDAC6 inhibitors; antipsychotics; LRRK2 inhibitors; MAO-B inhibitors; and levodopa wherein the compound of formula I and the second therapeutic agent are each employed in an amount that renders the combination effective for treating cognitive impairments associated with Alzheimer's disease, Parkinson's disease, or schizophrenia.

(e) The combination of (d), wherein the second therapeutic agent is an antipsychotic selected from the group consisting of clozapine, olanzapine, risperidone, aripiprazole, quetiapine, haloperidol, loxapine, thioridazine, molindone, thiothixene, fluphenazine, mesoridazine, trifluoperazine, chlorpromazine, and perphenazine.

(f) A use of a compound of formula I in the preparation of a medicament for modulating α7 nAChR activity in a subject in need thereof.

(g) A use of a compound of formula I in the preparation of a medicament for treating cognitive impairments associated with Alzheimer's disease, Parkinson's disease, and schizophrenia in a subject in need thereof.

(h) A method of treating cognitive impairments associated with Alzheimer's disease, Parkinson's disease, and schizophrenia and/or reducing the likelihood or severity of symptoms of cognitive impairments associated with Alzheimer's disease, Parkinson's disease, and schizophrenia in a subject in need thereof, which comprises administering to the subject an effective amount of a compound of formula I.

(i) The method of (h), wherein the compound of formula I is administered in combination with an effective amount of at least one second therapeutic agent selected from the group consisting of acetylcholinesterase inhibitors such as donepezil, rivastigmine, and galantamine; NMDA receptor antagonists such as memantine; beta-secretase inhibitors such as verubecestat, and AZD3293; M4 mAChR agonists or PAMs; mGluR2 antagonists or NAMs or PAMs; 5-HT6 antagonists such as idalopirdine, RVT-101, AVN-101, AVN322, SUVN-502, and SYN-120; histamine H3 receptor antagonists such as S38093; PDE4 inhibitors such as HT0712; PDE9 inhibitors such as BI40936; HDAC6 inhibitors; antipsychotics; LRRK2 inhibitors; MAO-B inhibitors; and levodopa.

(j) The method of (i), wherein the second therapeutic agent is an antipsychotic selected from the group consisting of clozapine, olanzapine, risperidone, aripiprazole, quetiapine, haloperidol, loxapine, thioridazine, molindone, thiothixene, fluphenazine, mesoridazine, trifluoperazine, chlorpromazine, and perphenazine.

(k) A method of modulating α7 nAChR activity in a subject in need thereof, which comprises administering to the subject the pharmaceutical composition of (a), (b), or (c) or the combination of (d) or (e).

(l) A method of treating cognitive impairments associated with Alzheimer's disease, Parkinson's disease, and schizophrenia and/or reducing the likelihood or severity of symptoms of cognitive impairments associated with Alzheimer's disease, Parkinson's disease, and schizophrenia in a subject in need thereof, which comprises administering to the subject the pharmaceutical composition of (a), (b), or (c) or the combination of (d) or (e).

In the embodiments of the compounds and salts provided above, it is to be understood that each embodiment may be combined with one or more other embodiments, to the extent that such a combination provides a stable compound or salt and is consistent with the description of the embodiments. It is further to be understood that the embodiments of compositions and methods provided as (a) through (l) above are understood to include all embodiments of the compounds and/or salts, including such embodiments as result from combinations of embodiments.

Additional embodiments of the invention include the pharmaceutical compositions, combinations, uses and methods set forth in (a) through (l) above, wherein the compound of the present invention employed therein is a compound of one of the embodiments, aspects, classes, sub-classes, or features of the compounds described above. In all of these embodiments, the compound may optionally be used in the form of a pharmaceutically acceptable salt or hydrate as appropriate.

The present invention also includes a compound of the present invention for use (i) in, (ii) as a medicament for, or (iii) in the preparation of a medicament for: (a) preventing or treating cognitive impairments associated with Alzheimer's disease, Parkinson's disease, schizophrenia, and L-DOPA induced-dyskinesia, or (b) treating cognitive impairments associated with Alzheimer's disease, Parkinson's disease, schizophrenia, and L-DOPA induced-dyskinesia and/or reducing the likelihood or severity of symptoms of cognitive impairments associated with Alzheimer's disease, Parkinson's disease, schizophrenia, and L-DOPA induced-dyskinesia, or (c) use in medicine. In these uses, the compounds of the present invention can optionally be employed in combination with one or more second therapeutic agents selected from acetylcholinesterase inhibitors such as donepezil, rivastigmine, and galantamine; NMDA receptor antagonists such as memantine; beta-secretase inhibitors such as verubecestat, and AZD3293; M4 mAChR agonists or PAMs; mGluR2 antagonists or NAMs or PAMs; 5-HT6 antagonists such as idalopirdine, RVT-101, AVN-101, AVN322, SUVN-502, and SYN-120; histamine H3 receptor antagonists such as S38093; PDE4 inhibitors such as HT0712; PDE9 inhibitors such as BI40936; HDAC6 inhibitors; antipsychotics; LRRK2 inhibitors; MAO-B inhibitors; and levodopa.

Chemical names, common names, and chemical structures may be used interchangeably to describe the same structure. If a chemical compound is referred to using both a chemical structure and a chemical name and an ambiguity exists between the structure and the name, the structure is understood to predominate.

As used herein, the term "administration" and variants thereof (e.g., "administering" a compound) in reference to a compound of the invention means providing the compound to the individual in need of treatment. When a compound of the invention is provided in combination with one or more other active agents (e.g., cholinesterase inhibitors such as donepezil, rivastigmine, and galantamine), "administration" and its variants are each understood to include concurrent and sequential administration of the compound or salt and other agents.

The term "alkenyl" refers to a hydrocarbon radical straight or branched containing from 2 to 12 carbon atoms and at least one carbon to carbon double bond. Up to four carbon-carbon double bonds may be present. Thus, "$C_2$-$C_6$ alkenyl" means an alkenyl radical having from 2 to 6 carbon atoms. Thus, "$C_2$-$C_4$ alkenyl" means an alkenyl radical having from 2 to 4 carbon atoms. Alkenyl groups include ethenyl, propenyl, butenyl, 3-methylbutenyl and so on. In one embodiment, an alkenyl group is linear. In another embodiment, an alkenyl group is branched.

The term "alkyl" refers to an aliphatic hydrocarbon group having one of its hydrogen atoms replaced with a bond. An alkyl group may be straight or branched. An alkyl group contains from 1 to 8 carbon atoms [($C_1$-$C_8$)alkyl] or from 1 to 6 carbon atoms [($C_1$-$C_6$)alkyl] or from 1 to 4 carbon atoms [($C_1$-$C_4$)alkyl]. Non-limiting examples of alkyl groups include methyl (Me), ethyl, n-propyl, isopropyl, n-butyl, sec-butyl, isobutyl, and tert-butyl. In one embodiment, an alkyl group is linear. In another embodiment, an alkyl group is branched.

When "alkyl" is substituted, said "alkyl" includes alkyl, O-alkyl, S-alkyl and (C=O)-alkyl.

The term "alkynyl" refers to a hydrocarbon radical straight or branched containing from 2 to 12 carbon atoms and at least one carbon to carbon triple bond. Up to three carbon-carbon triple bonds may be present. Thus, "$C_2$-$C_6$ alkynyl" means an alkynyl radical having from 2 to 6 carbon atoms. Thus, "$C_2$-$C_4$ alkynyl" means an alkynyl radical having from 2 to 4 carbon atoms. Alkynyl groups include ethynyl, propynyl, butynyl, 3-methylbutynyl and so on. In one embodiment, an alkynyl group is linear. In another embodiment, an alkynyl group is branched.

The term "alkoxy" refers to an alkyl (carbon and hydrogen chain) group singularly bonded to oxygen (R—O). Non-limiting examples of alkoxy are methoxy ($CH_3$ O—), ethoxy ($CH_3$ $CH_2$ O—) and butoxy ($CH_3$ $CH_2$ $CH_2$ O—).

The term "aminoalkyl" is any amino derivative of an alkyl radical.

The term "aryl" refers to any mono- and poly-carbocyclic ring systems wherein the individual carbocyclic rings in the polyring systems are fused or attached to each other via a single bond and wherein at least one ring is aromatic. Suitable aryl groups include phenyl, indanyl, naphthyl, tetrahydronaphthyl, and biphenyl. Aryl ring systems may include, where appropriate, an indication of the variable to which a particular ring atom is attached. Unless otherwise indicated, substituents to the aryl ring systems can be attached to any ring atom, provided that such attachment results in formation of a stable ring system.

In an embodiment, "aryl" is phenyl.

When "aryl" is substituted, said "aryl" includes aryl and O-aryl.

"Celite®" (Fluka) diatomite is diatomaceous earth, and can be referred to as "celite".

The term "compound" refers to the free compound and, to the extent they are stable, any hydrate or solvate thereof. A hydrate is the compound complexed with water, and solvate is the compound complexed with an organic solvent.

The term "composition" is intended to encompass a product comprising the specified ingredients, as well as any product which results from combining the specified ingredients.

The term "cycloalkyl" as used herein, refers to any non-aromatic mono- and poly-carbocyclic ring systems comprising from 3 to 10 ring carbon atoms [($C_3$-$C_{10}$) cycloalkyl], or from 3 to 6 ring carbon atoms [($C_3$-$C_6$) cycloalkyl] wherein the individual carbocyclic rings in the polyring systems are fused, including spiro ring fusions, or attached to each other via a single bond. Non-limiting examples of monocyclic cycloalkyls include cyclopropyl, cyclobutyl, cyclopentyl, cyclohexyl, bicyclo[4.1.0]heptyl, spiro[2.4]heptyl, spiro[3.3]heptyl, spiro[2.5]octyl, and cycloheptyl. A ring carbon atom of a cycloalkyl group may be functionalized as a carbonyl group. An illustrative example of such a cycloalkyl group (also referred to herein as a "cycloalkanoyl" group) includes, but is not limited to, cyclobutanoyl:

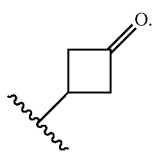 [SMILES: *C1CC(=O)C1]

When "cycloalkyl" is substituted, said "cycloalkyl" includes cycloalkyl, O-cycloalkyl and (C=O)-cycloalkyl.

In an embodiment, "cycloalkyl" is cyclopropyl, cyclobutyl, cyclopentyl or cyclohexyl.

The term "effective amount" as used herein means that amount of active compound or pharmaceutical agent that elicits the biological or medicinal response in a tissue, system, animal or human that is being sought by a researcher, veterinarian, medical doctor or other clinician. In one embodiment, the effective amount is a "therapeutically effective amount" for the alleviation of one or more symptoms of the disease or condition being treated. In another embodiment, the effective amount is a "prophylactically effective amount" for reduction of the severity or likelihood of one or more symptoms of the disease or condition. The term also includes herein the amount of active compound sufficient to modulate α7 nAChR activity and thereby elicit the response being sought (i.e., a "therapeutically effective amount"). When the active compound (i.e., active ingredient) is administered as the salt, references to the amount of active ingredient are to the free acid or free base form of the compound.

The term "halogen" (or "halo") refers to atoms of fluorine, chlorine, bromine and iodine (alternatively referred to as fluoro (F), chloro (Cl), bromo (Br), and iodo (I)).

"Haloalkyl" refers to an alkyl group as described above wherein one or more (in particular 1 to 5) hydrogen atoms have been replaced by halogen atoms, with up to complete substitution of all hydrogen atoms with halo groups. $C_{1-6}$ haloalkyl, for example, includes —$CF_3$, —$CF_2CF_3$, —$CHFCH_3$, and the like.

The term "heteroalkyl" refers to an alkyl group where one or more of the carbon atoms is substituted by a heteroatom independently selected from N, O, or S.

"Hydroxyalkyl" refers to an alkyl group as described above in which one or more (in particular 1 to 3) hydrogen atoms have been replaced by hydroxy groups. Examples include $CH_2OH$, $CH_2CHOH$ and $CHOHCH_3$.

The term "heteroaryl" as used herein, refers to any monocyclic or multicyclic ring system comprising 5 to 14 ring atoms, wherein from 1 to 4 of the ring atoms is independently O, N, or S and the remaining ring atoms are carbon atoms, and wherein at least one ring is aromatic. In one embodiment, a heteroaryl group has 5 to 10 ring atoms. In another embodiment, a heteroaryl group is monocyclic and has 5 or 6 ring atoms. In another embodiment, a heteroaryl group is bicyclic and has 9 or 10 ring atoms. A heteroaryl group is usually joined via a ring carbon atom but may be joined via a non-carbon atom provided that this results in a stable compound, and any nitrogen atom of a heteroaryl can be optionally oxidized to the corresponding N-oxide. The term "heteroaryl" also encompasses a heteroaryl group, as defined above, which is fused to a benzene ring. The term "heteroaryl" also encompasses any fused polycyclic ring system containing at least one ring heteroatom selected from N, O, and S, wherein at least one ring of the fused polycyclic ring system is aromatic. For example, the term "9 to 10-membered bicyclic heteroaryl" encompasses a non-aromatic 5 membered heterocyclic ring that is fused to a benzene or pyridyl ring. Non-limiting examples of heteroaryls include benzimidazolyl, benzimidazolonyl, benzofuranyl, benzofurazanyl, benzopyrazolyl, benzothiazolyl, benzotriazolyl, benzothiophenyl, benzoxazolyl, carbazolyl, carbolinyl, cinnolinyl, furanyl, imidazolyl, indolinyl, indolyl, indolazinyl, indazolyl, isobenzofuranyl, isoindolyl, isoquinolyl, isothiazolyl, isoxazolyl, naphthpyridinyl, oxadiazolyl, oxazolyl, pyrazinyl, pyrazolyl, pyridazinyl, pyridopyridinyl, pyridazinyl, pyridyl, pyrimidyl, pyrrolyl, quinazolinyl, quinolyl, quinoxalinyl, tetrazolyl, tetrazolopyridyl, thiadiazolyl, thiazolyl, thienyl, triazolyl, dihydrobenzoimidazolyl, dihydrobenzofuranyl, dihydrobenzothiophenyl, dihydrobenzoxazolyl, dihydroindolyl, dihydroquinolinyl, methylenedioxybenzoyl and the like, and all isomeric forms thereof. The term "heteroaryl" also refers to partially saturated heteroaryl moieties such as, for example, tetrahydroisoquinolyl, tetrahydroquinolyl and the like, provided that they contain at least one aromatic ring. In one embodiment, a heteroaryl group is a 5-membered heteroaryl. In another embodiment, a heteroaryl group is a 6-membered heteroaryl. In another embodiment, a heteroaryl group comprises a 5- to 6-membered heteroaryl group fused to a benzene ring.

In an embodiment, "heteroaryl" is benzimidazolyl, benzimidazolonyl, benzothiazolyl, benzofuranyl, benzofurazanyl, benzopyrazolyl, benzotriazolyl, benzothiophenyl, benzoxazolyl, carbazolyl, carbolinyl, cinnolinyl, furanyl, imidazolyl, indolinyl, indolyl, indolazinyl, indazolyl, isobenzofuranyl, isoindolyl, isoquinolyl, isothiazolyl, isoxazolyl, naphthpyridinyl, oxadiazolyl, oxazolyl, pyrazinyl, pyrazolyl, pyridazinyl, pyridopyridinyl, pyridazinyl, pyridyl, pyrimidyl, pyrrolyl, quinazolinyl, quinolyl, quinoxalinyl, tetrazolyl, tetrazolopyridyl, thiadiazolyl, thiazolyl, thienyl, or triazolyl.

In another embodiment, "heteroaryl" is carbazolyl, carbolinyl, cinnolinyl, furanyl, imidazolyl, indolinyl, indolyl, indolazinyl, indazolyl, isobenzofuranyl, isoindolyl, isoquinolyl, isothiazolyl, isoxazolyl, naphthpyridinyl, oxadiazolyl, oxazolyl, pyrazinyl, pyrazolyl, pyridazinyl, pyridopyridinyl, pyridazinyl, pyridyl, pyrimidyl, pyrrolyl, quinazolinyl, quinolyl, quinoxalinyl, tetrazolyl, tetrazolopyridyl, thiadiazolyl, thiazolyl, thienyl, or triazolyl.

In another embodiment, "heteroaryl" is furanyl, imidazolyl, indolinyl, indolyl, indolazinyl, indazolyl, isoindolyl, isoquinolyl, isothiazolyl, isoxazolyl, oxadiazolyl, oxazolyl, pyrazinyl, pyrazolyl, pyridazinyl, pyridazinyl, pyridyl, pyrimidyl, pyrrolyl, thiadiazolyl, thiazolyl, thienyl, or triazolyl.

In some embodiments, the heteroaryl group is a 6-14 membered ring system. Non-limiting examples of 6-14 heteroaryls include benzimidazolyl, benzimidazolonyl, benzofuranyl, benzofurazanyl, benzopyrazolyl, benzotriazolyl, benzothiophenyl, benzoxazolyl, benzothiazolyl, carbazolyl, carbolinyl, cinnolinyl, indolinyl, indolyl, indolazinyl, indazolyl, isobenzofuranyl, isoindolyl, isoquinolyl, naphthpyridinyl, pyrazinyl, pyridazinyl, pyridopyridinyl, pyridazinyl, pyridyl, pyrimidyl, quinazolinyl, quinolyl, quinoxalinyl, tetrazolopyridyl, dihydrobenzoimidazolyl, dihydrobenzofuranyl, dihydrobenzothiophenyl, dihydrobenzoxazolyl, dihydroindolyl, dihydroquinolinyl, tetrahydrobenzoxazolyl, oxazolopyridinyl, imidazopyridazinyl, dihydrocyclopentaoxazolyl, pyrazolopyridinyl, thienopyridinyl, tetrahydropyrazolopyridinyl, furopyridinyl, dihydropyridooxazinyl, dihydrobenzothiazolyl, tetrahydrobenzothiazolyl, thiazolopyridinyl, pyridopyrimidinyl, phthalazinyl, pyridopyrazinyl, thienoxazolyl, and thienothiazolyl, and the like.

The term "heterocycle" or "heterocyclyl" as used herein is intended to mean a 3- to 10-membered non-aromatic heterocycle containing from 1 to 4 heteroatoms selected from the group consisting of O, N, and S, and includes monocyclic or bicyclic groups (fused, bridged or spirocyclic). Further examples of "heterocyclyl" include, but are not limited to the following: oxazoline, isoxazoline, oxetanyl, tetrahydropyranyl, azetidinyl, 1,4-dioxanyl, hexahydroazepinyl, piperazinyl, piperidinyl, pyrrolidinyl, morpholinyl, thiomorpholinyl, dihydrofuranyl, dihydroimidazolyl, dihydroisooxazolyl, dihydroisothiazolyl, dihydrooxadiazolyl, dihydrooxazolyl, dihydropyrazinyl, dihydropyrazolyl, dihydropyridinyl, dihydropyrimidinyl, dihydropyrrolyl, dihydrotetrazolyl, dihydrothiadiazolyl, dihydrothiazolyl, dihydrothienyl, dihydrotriazolyl, tetrahydrofuranyl, and tetrahydrothienyl, and N-oxides thereof. Attachment of a heterocyclyl substituent can occur via a carbon atom or via a heteroatom.

In an embodiment, "heterocycle" or "heterocyclyl" is oxazoline, isoxazoline, oxetanyl, tetrahydropyranyl, azetidinyl, 1,4-dioxanyl, hexahydroazepinyl, piperazinyl, piperidinyl, pyrrolidinyl, morpholinyl, or thiomorpholinyl.

In an embodiment, "heterocycle" or heterocyclyl" is dihydrofuranyl, dihydroimidazolyl, dihydroisooxazolyl, dihydroisothiazolyl, dihydrooxadiazolyl, dihydrooxazolyl, dihydropyrazinyl, dihydropyrazolyl, dihydropyridinyl, dihydropyrimidinyl, dihydropyrrolyl, dihydrotetrazolyl, dihydrothiadiazolyl, dihydrothiazolyl, dihydrothienyl, dihydrotriazolyl, tetrahydrofuranyl, or tetrahydrothienyl.

In an embodiment, "heterocycle" or heterocyclyl" is morpholinyl and piperidinyl.

By "pharmaceutically acceptable" is meant that the ingredients of the pharmaceutical composition must be compatible with each other and not deleterious to the recipient thereof.

As used herein, the term "optionally" means that the subsequently described event(s) may or may not occur, and includes both event(s), which occur, and events that do not occur.

The term "preventing" as used herein with respect to Alzheimer's disease or other neurological diseases, refers to reducing the likelihood of disease progression.

The term "subject" (alternatively referred to herein as "patient"), as used herein, refers to an animal, preferably a mammal, most preferably a human.

The term "substituted" means that one or more hydrogens on the designated atom is replaced with a selection from the indicated group, provided that the designated atom's normal valency under the existing circumstances is not exceeded, and that the substitution results in a stable compound. Unless expressly stated to the contrary, substitution by a named substituent is permitted on any atom provided such substitution is chemically allowed and results in a stable compound. Combinations of substituents and/or variables are permissible only if such combinations result in stable compounds.

The term "substituted with one or more" refers to substitution with the named substituent or substituents, multiple degrees of substitution, up to replacing all hydrogen atoms with the same or different substituents, being allowed unless the number of substituents is explicitly stated. Where the number of substituents is not explicitly stated, one or more is intended.

The term "solvate" refers to a complex of variable stoichiometry formed by a solute (in this invention, a compound of formula I, or a salt thereof) and a solvent. Such solvents for the purpose of the invention may not interfere with the biological activity of the solute. Examples of suitable solvents include, but are not limited to, water, acetone, methanol, ethanol and acetic acid. Preferably the solvent used is a pharmaceutically acceptable solvent. Examples of suitable pharmaceutically acceptable solvents included water, ethanol and acetic acid.

A "stable" compound is a compound that can be prepared and isolated and whose structure and properties remain or can be caused to remain essentially unchanged for a period of time sufficient to allow use of the compound for the purposes described herein (e.g., therapeutic or prophylactic administration to a subject).

In the compounds of formula I, the atoms may exhibit their natural isotopic abundances, or one or more of the atoms may be artificially enriched in a particular isotope having the same atomic number, but an atomic mass or mass number different from the atomic mass or mass number predominantly found in nature. The present invention is meant to include all suitable isotopic variations of the compounds of formula I. For example, different isotopic forms of hydrogen (H) include protium ($^1$H) and deuterium ($^2$H or D). Protium is the predominant hydrogen isotope found in nature. Enriching for deuterium may afford certain therapeutic advantages, such as increasing in vivo half-life or reducing dosage requirements, or may provide a compound useful as a standard for characterization of biological samples. Isotopically-enriched compounds within formula I can be prepared without undue experimentation by conventional techniques well known to those skilled in the art or by processes analogous to those described in the Schemes and Examples herein using appropriate isotopically-enriched reagents and/or intermediates.

Unless expressly stated to the contrary, all ranges cited herein are inclusive. For example, a heteroaryl ring described as containing from "1 to 3 heteroatoms" means the ring can contain 1, 2, or 3 heteroatoms. It is also to be understood that any range cited herein includes within its scope all of the sub-ranges within that range. The oxidized forms of the heteroatoms N and S are also included within the scope of the present invention.

It is understood by one skilled in the art that carbon atoms in organic molecules may often be replaced by silicon atoms to give analogous stable compounds. For example, carbon atoms in alkyl, cycloalkyl, aryl, heteroaryl, and heterocyclyl, groups may often be replaced by silicon atoms to provide stable compounds. All such compounds are within the scope of the present invention.

When any variable (for example, R) occurs more than one time in any constituent or in formula I or in any other formula depicting and describing compounds of the invention, its definition on each occurrence is independent of its definition at every other occurrence. Also, combinations of substituents and/or variables are permissible only if such combinations result in stable compounds.

The compounds of formula I may contain asymmetric or chiral centers, and, therefore, exist in different stereoisomeric forms. It is intended that all stereoisomeric forms of the compounds of formula I as well as mixtures thereof, including racemic mixtures, form part of the present invention. Diastereomeric mixtures can be separated into their individual diastereomers on the basis of their physical chemical differences by methods well known to those skilled in the art, such as, for example, by chromatography and/or fractional crystallization. Enantiomers can be separated by converting the enantiomeric mixture into a diastereomeric mixture by reaction with an appropriate optically active compound (e.g., chiral auxiliary such as a chiral alcohol or Mosher's acid chloride), separating the diastereomers and converting (e.g., hydrolyzing) the individual diastereomers to the corresponding pure enantiomers. Enantiomers can also be separated by chromatography employing columns with a chiral stationary phase. Also, some of the compounds of formula I may be atropisomers (e.g., substituted biaryls) and are considered as part of this invention.

Certain of the compounds of the present invention can exist as tautomers. For the purposes of the present invention a reference to a compound of formula I is a reference to the compound per se, or to any one of its tautomers per se, or to mixtures of two or more tautomers.

The compounds of formula I may have the ability to crystallize in more than one form, a characteristic known as polymorphism, and it is understood that such polymorphic forms ("polymorphs") are within the scope of formula I. Polymorphism generally can occur as a response to changes in temperature or pressure or both and can also result from variations in the crystallization process. Polymorphs can be distinguished by various physical characteristics known in the art such as x-ray diffraction patterns, solubility and melting point.

The invention includes within its scope all possible stoichiometric and non-stoichiometric forms of the compounds of formula I.

The compounds of the present invention may have utility in preventing, treating, or ameliorating Alzheimer's disease. The compounds may also be useful in preventing, treating, or ameliorating other diseases mediated by the α7 nAChR, such as schizophrenia, sleep disorders, Parkinson's disease, autism, microdeletion syndrome, inflammatory diseases, pain disorders (including acute pain, inflammatory pain and neuropathic pain) and cognitive disorders (including mild cognitive impairment). Other conditions that may be prevented, treated, or ameliorated by the compounds of the invention include pulmonary hypertension, chronic obstructive pulmonary disease (COPD), asthma, urinary incontinence, glaucoma, Trisomy 21 (Down Syndrome), cerebral amyloid angiopathy, degenerative dementia, Hereditary Cerebral Hemorrhage with Amyloidosis of the Dutch-Type (HCHWA-D), Creutzfeld-Jakob disease, prion disorders, amyotrophic lateral sclerosis, progressive supranuclear palsy, head trauma, stroke, pancreatitis, inclusion body myositis, other peripheral amyloidoses, diabetes, kidney diseases, cancer, and atherosclerosis.

In preferred embodiments, the compounds of the invention may be useful in preventing, treating, or ameliorating Alzheimer's disease, cognitive disorders, schizophrenia, pain disorders and sleep disorders. For example, the compounds may be useful for the prevention of dementia of the Alzheimer's type, as well as for the treatment of early stage, intermediate stage or late stage dementia of the Alzheimer's type.

Potential schizophrenia conditions or disorders for which the compounds of the invention may be useful include one or more of the following conditions or diseases: schizophrenia or psychosis including schizophrenia (paranoid, disorganized, catatonic or undifferentiated), schizophreniform disorder, schizoaffective disorder, delusional disorder, brief psychotic disorder, shared psychotic disorder, psychotic disorder due to a general medical condition and substance-induced or drug-induced (phencyclidine, ketamine and other dissociative anaesthetics, amphetamine and other psychostimulants and cocaine) psychosis psychotic disorder, psychosis associated with affective disorders, brief reactive psychosis, schizoaffective psychosis, "schizophrenia-spectrum" disorders such as schizoid or schizotypal personality disorders, or illness associated with psychosis (such as major depression, manic depressive (bipolar) disorder, Alzheimer's disease and post-traumatic stress syndrome), including both the positive and the negative symptoms of schizophrenia and other psychoses; cognitive disorders including dementia (associated with Alzheimer's disease, ischemia, multi-infarct dementia, trauma, vascular problems or stroke, HIV disease, Parkinson's disease, Huntington's disease, Pick's disease, Creutzfeldt-Jacob disease, perinatal hypoxia, other general medical conditions or substance abuse); delirium, amnestic disorders or age related cognitive decline.

Thus, in another specific embodiment, the present invention provides a method for preventing, treating, or ameliorating schizophrenia or psychosis comprising administering to a patient in need thereof an effective amount of a compound of the present invention. At present, the text revision of the fourth edition of the Diagnostic and Statistical Manual of Mental Disorders (DSM-IV-TR) (2000, American Psychiatric Association, Washington DC) provides a diagnostic tool that includes paranoid, disorganized, catatonic or undifferentiated schizophrenia and substance-induced psychotic disorder. As used herein, the term "schizophrenia or psychosis" includes treatment of those mental disorders as described in DSM-IV-TR. The skilled artisan will recognize that there are alternative nomenclatures, nosologies and classification systems for mental disorders, and that these systems evolve with medical and scientific progress. Thus the term "schizophrenia or psychosis" is intended to include like disorders that are described in other diagnostic sources.

Potential sleep conditions or disorders for which the compounds of the invention may be useful include enhancing sleep quality; improving sleep quality; augmenting sleep maintenance; increasing the value which is calculated from the time that a subject sleeps divided by the time that a subject is attempting to sleep; decreasing sleep latency or onset (the time it takes to fall asleep); decreasing difficulties in falling asleep; increasing sleep continuity; decreasing the number of awakenings during sleep; decreasing nocturnal arousals; decreasing the time spent awake following the initial onset of sleep; increasing the total amount of sleep; reducing the fragmentation of sleep; altering the timing, frequency or duration of REM sleep bouts; altering the timing, frequency or duration of slow wave (i.e. stages 3 or 4) sleep bouts; increasing the amount and percentage of stage 2 sleep; promoting slow wave sleep; enhancing EEG-delta activity during sleep; increasing daytime alertness; reducing daytime drowsiness; treating or reducing excessive daytime sleepiness; insomnia; hypersomnia; narcolepsy; interrupted sleep; sleep apnea; wakefulness; nocturnal myoclonus; REM sleep interruptions; jet-lag; shift workers' sleep disturbances; dyssomnias; night terror; insomnias associated with depression; emotional/mood disorders; as well as sleep walking and enuresis; and sleep disorders which accompany aging; Alzheimer's sundowning; conditions associated with circadian rhythmicity as well as mental and physical disorders associated with travel across time zones and with rotating shift-work schedules; conditions due to drugs which cause reductions in REM sleep as a side effect; syndromes which are manifested by non-restorative sleep and muscle pain or sleep apnea which is associated with respiratory disturbances during sleep; and conditions which result from a diminished quality of sleep.

Pain disorders for which the compounds of the invention may be useful include neuropathic pain (such as postherpetic neuralgia, nerve injury, the "dynias", e.g., vulvodynia, phantom limb pain, root avulsions, painful diabetic neuropathy, painful traumatic mononeuropathy, painful polyneuropathy); central pain syndromes (potentially caused by virtually any lesion at any level of the nervous system); postsurgical pain syndromes (eg, postmastectomy syndrome, postthoracotomy syndrome, stump pain); bone and joint pain (osteoarthritis); repetitive motion pain; dental pain; cancer pain;

myofascial pain (muscular injury, fibromyalgia); perioperative pain (general surgery, gynecological); chronic pain; dysmennorhea, as well as pain associated with angina, and inflammatory pain of varied origins (e.g. osteoarthritis, rheumatoid arthritis, rheumatic disease, teno-synovitis and gout); headache; migraine and cluster headache; primary hyperalgesia; secondary hyperalgesia; primary allodynia; secondary allodynia; or other pain caused by central sensitization.

Potential conditions or disorders that have a strong inflammatory component for which the compounds of the invention may be useful include one or more of the following conditions or diseases: diabetes (systemic inflammation in diabetes marked by increases in blood cytokines e.g. IL-6 and TNFα which may lead to insulin resistance); asthma; arthritis; cystic fibrosis; sepsis; ulcerative colitis; inflammatory bowel disease; atherosclerosis; neuroinflammation associated with neurodegenerative diseases (e.g. Alzheimer's disease, Parkinson's disease, Creutzfeldt-Jacob disease, frontotemporal dementia, corticobasal degeneration, Pick's disease, progressive supranuclear palsy, traumatic brain injury, Huntington's disease, amyotrophic lateral sclerosis).

Compounds of the invention may also be used to treat or prevent or ameliorate dyskinesia and protect against neurodegeneration in nigrostriatal neurons in Parkinson's disease. Furthermore, compounds of the invention may be used to decrease tolerance and/or dependence to opioid treatment of pain, and for treatment of withdrawal syndrome of e.g., alcohol, opioids, and cocaine.

The compounds of the present invention may be administered in the form of pharmaceutically acceptable salts. The term "pharmaceutically acceptable salt" refers to a salt that possesses the effectiveness of the parent compound and that is not biologically or otherwise undesirable (e.g., is neither toxic nor otherwise deleterious to the recipient thereof). Suitable salts include acid addition salts that may, for example, be formed by mixing a solution of the compound of the present invention with a solution of a pharmaceutically acceptable acid such as hydrochloric acid, sulfuric acid, acetic acid, trifluoroacetic acid, or benzoic acid. Many of the compounds of the invention carry an acidic moiety, in which case suitable pharmaceutically acceptable salts thereof can include alkali metal salts (e.g., sodium or potassium salts), alkaline earth metal salts (e.g., calcium or magnesium salts), and salts formed with suitable organic ligands such as quaternary ammonium salts. Also, in the case of an acid (—COOH) or alcohol group being present, pharmaceutically acceptable esters can be employed to modify the solubility or hydrolysis characteristics of the compound.

Exemplary acid addition salts include acetates, ascorbates, benzoates, benzenesulfonates, bisulfates, borates, butyrates, citrates, camphorates, camphorsulfonates, fumarates, hydrochlorides, hydrobromides, hydroiodides, lactates, maleates, methanesulfonates ("mesylates"), naphthalenesulfonates, nitrates, oxalates, phosphates, propionates, salicylates, succinates, sulfates, tartarates, thiocyanates, toluenesulfonates (also known as tosylates) and the like. Additionally, acids which are generally considered suitable for the formation of pharmaceutically useful salts from basic pharmaceutical compounds are discussed, for example, by P. Stahl et al, Camille G. (eds.) *Handbook of Pharmaceutical Salts. Properties, Selection and Use*. (2002) Zurich: Wiley-VCH; S. Berge et al, *Journal of Pharmaceutical Sciences* (1977) 66(1):1-19; P. Gould, *International J. of Pharmaceutics* (1986) 33:201-217; Anderson et al, *The Practice of Medicinal Chemistry* (1996), Academic Press, New York; and in The Orange Book (Food & Drug Administration, Washington, D.C. on their website).

Exemplary basic salts include ammonium salts, alkali metal salts such as sodium, lithium, and potassium salts, alkaline earth metal salts such as calcium and magnesium salts, salts with organic bases (for example, organic amines) such as dicyclohexylamine, t-butyl amine, choline, and salts with amino acids such as arginine, lysine and the like. Basic nitrogen-containing groups may be quarternized with agents such as lower alkyl halides (e.g., methyl, ethyl, and butyl chlorides, bromides and iodides), dialkyl sulfates (e.g., dimethyl, diethyl, and dibutyl sulfates), long chain halides (e.g., decyl, lauryl, and stearyl chlorides, bromides and iodides), aralkyl halides (e.g., benzyl and phenethyl bromides), and others.

For the purposes of preventing, treating, or ameliorating the cognitive impairments in Alzheimer's disease, Parkinson's disease, schizophrenia, L-DOPA induced-dyskinesia, and inflammation, the compounds of the present invention, optionally in the form of a salt, can be administered by any means that produces contact of the active agent with the agent's site of action. They can be administered by one or more conventional means available for use in conjunction with pharmaceuticals, either as individual therapeutic agents or in a combination of therapeutic agents. They can be administered alone, but typically are administered with a pharmaceutical carrier selected on the basis of the chosen route of administration and standard pharmaceutical practice. The compounds of the invention can, for example, be administered by one or more of the following: orally, parenterally (including subcutaneous injections, intravenous, intramuscular, intrasternal injection or infusion techniques), by inhalation (such as in a spray form), or rectally, in the form of a unit dosage of a pharmaceutical composition containing an effective amount of the compound and conventional non-toxic pharmaceutically-acceptable carriers, adjuvants and vehicles. Liquid preparations suitable for oral administration (e.g., suspensions, syrups, elixirs and the like) can be prepared according to techniques known in the art and can employ any of the usual media such as water, glycols, oils, alcohols and the like. Solid preparations suitable for oral administration (e.g., powders, pills, capsules and tablets) can be prepared according to techniques known in the art and can employ such solid excipients as starches, sugars, kaolin, lubricants, binders, disintegrating agents and the like. Parenteral compositions can be prepared according to techniques known in the art and typically employ sterile water as a carrier and optionally other ingredients, such as solubility aids. Injectable solutions can be prepared according to methods known in the art wherein the carrier comprises a saline solution, a glucose solution or a solution containing a mixture of saline and glucose. Further description of methods suitable for use in preparing pharmaceutical compositions of the present invention and of ingredients suitable for use in said compositions is provided in Remington's Pharmaceutical Sciences, 18$^{th}$ edition (ed. A. R. Gennaro, Mack Publishing Co., 1990).

The compounds of this invention can be administered orally in a dosage range of 0.001 to 1000 mg/kg of mammal (e.g., human) body weight per day in a single dose or in divided doses. One dosage range is 0.01 to 500 mg/kg body weight per day orally in a single dose or in divided doses. Another dosage range is 0.1 to 100 mg/kg body weight per day orally in single or divided doses. For oral administration, the compositions can be provided in the form of tablets or capsules containing 1.0 to 500 mg of the active ingredient, particularly 1, 5, 10, 15, 20, 25, 50, 75, 100, 150, 200, 250, 300, 400, and 500 mg of the active ingredient for the symptomatic adjustment of the dosage to the patient to be treated. The specific dose level and frequency of dosage for any particular patient may be varied and will depend upon a variety of factors including the activity of the specific compound employed, the metabolic stability and length of action of that compound, the age, body weight, general health, sex, diet, mode and time of administration, rate of excretion, drug combination, and the severity of the particular condition.

As noted above, the present invention also relates to a method of preventing, treating, or ameliorating the cognitive impairments in Alzheimer's disease, Parkinson's disease, schizophrenia, L-DOPA induced-dyskinesia, and inflammation with a compound of the present invention in combination with one or more therapeutic agents and a pharmaceutical composition comprising a compound of the present invention and one or more therapeutic agents selected from the group consisting of anti-Alzheimer's Disease agents, for example beta-secretase inhibitors; M1 mAChR agonist or PAMs; M4 mAChR agonists or PAMs; mGluR2 antagonists or NAMs or PAMs; ADAM 10 ligands or activators; gamma-secretase inhibitors, such as LY450139 and TAK 070; gamma secretase modulators; tau phosphorylation inhibitors; glycine transport inhibitors; LXR β agonists; ApoE4 conformational modulators; NR2B antagonists; androgen receptor modulators; blockers of Aβ oligomer formation; 5-HT4 agonists, such as PRX-03140; 5-HT6 antagonists, such as GSK 742467, SGS-518, FK-962, SL-65.0155, SRA-333 and xaliproden; 5-HT1a antagonists, such as lecozotan; p25/CDK5 inhibitors; NK1/NK3 receptor antagonists; COX-2 inhibitors; LRRK2 inhibitors; HMG-CoA reductase inhibitors; NSAIDs including ibuprofen; vitamin E; anti-amyloid antibodies (including anti-amyloid humanized monoclonal antibodies), such as bapineuzumab, ACC001, CAD106, AZD3102, H12A11V1; anti-inflammatory compounds such as (R)-flurbiprofen, nitroflurbiprofen, ND-1251, VP-025, HT-0712 and EHT-202; PPAR gamma agonists, such as pioglitazone and rosiglitazone; CB-1 receptor antagonists or CB-1 receptor inverse agonists, such as AVE1625; antibiotics such as doxycycline and rifampin; N-methyl-D-aspartate (NMDA) receptor antagonists, such as memantine, neramexane and EVT101; cholinesterase inhibitors such as galantamine, rivastigmine, donepezil, tacrine, phenserine, ladostigil and ABT-089; growth hormone secretagogues such as ibutamoren, ibutamoren mesylate, and capromorelin; histamine $H_3$ receptor antagonists such as ABT-834, ABT 829, GSK 189254 and CEP16795; AMPA agonists or AMPA modulators, such as CX-717, LY 451395, LY404187 and S-18986; PDE IV inhibitors, including MEM1414, HT0712 and AVE8112; $GABA_A$ inverse agonists; GSK3β inhibitors, including AZD1080, SAR502250 and CEP16805; neuronal nicotinic agonists; selective M1 agonists; HDAC inhibitors; and microtubule affinity regulating kinase (MARK) ligands; or other drugs that affect receptors or enzymes that either increase the efficacy, safety, convenience, or reduce unwanted side effects or toxicity of the compounds of the present invention.

Examples of combinations of the compounds of the instant invention include combinations with agents for the treatment of schizophrenia, for example in combination with sedatives, hypnotics, anxiolytics, antipsychotics, antianxiety agents, cyclopyrrolones, imidazopyridines, pyrazolopyrimidines, minor tranquilizers, melatonin agonists and antagonists, melatonergic agents, benzodiazepines, barbiturates, 5HT-2 antagonists, and the like, such as: adinazolam, allobarbital, alonimid, aiprazolam, amisulpride, amitriptyline, amobarbital, amoxapine, aripiprazole, bentazepam, benzoctamine, brotizolam, bupropion, busprione, butabarbital, butalbital, capuride, carbocloral, chloral betaine, chloral hydrate, clomipramine, clonazepam, cloperidone, clorazepate, chlordiazepoxide, clorethate, chlorpromazine, clozapine, cyprazepam, desipramine, dexclamol, diazepam, dichloralphenazone, divalproex, diphenhydramine, doxepin, estazolam, ethchlorvynol, etomidate, fenobam, flunitrazepam, flupentixol, fluphenazine, flurazepam, fluvoxamine, fluoxetine, fosazepam, glutethimide, halazepam, haloperidol, hydroxyzine, imipramine, lithium, lorazepam, lormetazepam, maprotiline, mecloqualone, melatonin, mephobarbital, meprobamate, methaqualone, midaflur, midazolam, nefazodone, nisobamate, nitrazepam, nortriptyline, olanzapine, oxazepam, paraldehyde, paroxetine, pentobarbital, perlapine, perphenazine, phenelzine, phenobarbital, prazepam, promethazine, propofol, protriptyline, quazepam, quetiapine, reclazepam, risperidone, roletamide, secobarbital, sertraline, suproelone, temazepam, thioridazine, thiothixene, tracazolate, tranylcypromaine, trazodone, triazolam, trepipam, tricetamide, triclofos, trifluoperazine, trimetozine, trimipramine, uldazepam, venlafaxine, zaleplon, ziprasidone, zolazepam, zolpidem, and salts thereof, and combinations thereof, and the like, or the subject compound may be administered in conjunction with the use of physical methods such as with light therapy or electrical stimulation.

In another embodiment, the compounds of the instant invention may be employed in combination with levodopa (with or without a selective extracerebral decarboxylase inhibitor such as carbidopa or benserazide), anticholinergics such as biperiden (optionally as its hydrochloride or lactate salt) and trihexyphenidyl (benzhexol) hydrochloride; COMT inhibitors such as entacapone, MAO-B inhibitors, antioxidants, A2a adenosine receptor antagonists, cholinergic agonists, NMDA receptor antagonists, serotonin receptor antagonists and dopamine receptor agonists such as alentemol, bromocriptine, fenoldopam, lisuride, naxagolide, pergolide and pramipexole. It will be appreciated that the dopamine agonist may be in the form of a pharmaceutically acceptable salt, for example, alentemol hydrobromide, bromocriptine mesylate, fenoldopam mesylate, naxagolide hydrochloride and pergolide mesylate.

In another embodiment, the compound of the instant invention may be employed in combination with a compound from the phenothiazine, thioxanthene, heterocyclic dibenzazepine, butyrophenone, diphenylbutylpiperidine and indolone classes of neuroleptic agent. Suitable examples of phenothiazines include chlorpromazine, mesoridazine, thioridazine, acetophenazine, fluphenazine, perphenazine and trifluoperazine. Suitable examples of thioxanthenes include chlorprothixene and thiothixene. An example of a dibenzazepine is clozapine. An example of a butyrophenone is haloperidol. An example of a diphenylbutylpiperidine is pimozide. An example of an indolone is molindolone. Other neuroleptic agents include loxapine, sulpiride and risperidone. It will be appreciated that the neuroleptic agents when used in combination with the compounds of the instant invention may be in the form of a pharmaceutically acceptable salt, for example, chlorpromazine hydrochloride, mesoridazine besylate, thioridazine hydrochloride, acetophenazine maleate, fluphenazine hydrochloride, flurphenazine enathate, fluphenazine decanoate, trifluoperazine hydrochloride, thiothixene hydrochloride, haloperidol decanoate, loxapine succinate and molindone hydrochloride. Perphenazine, chlorprothixene, clozapine, haloperidol, pimozide and risperidone are commonly used in a non-salt form. Thus, the compounds of the instant invention may be employed in combination with acetophenazine, alentemol, aripiprazole, amisulpride, benzhexol, bromocriptine, biperiden, chlorpromazine, chlorprothixene, clozapine, diazepam, fenoldopam, fluphenazine, haloperidol, levodopa, levodopa with benserazide, levodopa with carbidopa, lisuride, loxapine, mesoridazine, molindolone, naxagolide, olanzapine, pergolide, perphenazine, pimozide, pramipexole, quetiapine, risperidone, sulpiride, tetrabenazine, trihexyphenidyl, thioridazine, thiothixene, trifluoperazine or ziprasidone.

Examples of combinations of the compounds of the instant invention include combinations with agents for the treatment of pain, for example non-steroidal anti-inflammatory agents, such as aspirin, diclofenac, diflunisal, fenoprofen, flurbiprofen, ibuprofen, indomethacin, ketoprofen, ketorolac, naproxen, oxaprozin, piroxicam, sulindac and tolmetin; COX-2 inhibitors, such as celecoxib, rofecoxib, valdecoxib, 406381 and 644784; CB-2 agonists, such as 842166 and SAB378; VR-1 antagonists, such as AMG517, 705498, 782443, PAC20030, V114380 and A425619; bradykinin B1 receptor antagonists, such as SSR240612 and NVPSAA164; sodium channel blockers and antagonists, such as VX409 and SPI860; nitric oxide synthase (NOS) inhibitors (including iNOS and nNOS inhibitors), such as SD6010 and 274150; glycine site antagonists, including lacosamide; neuronal nicotinic agonists, such as ABT 894; NMDA antagonists, such as AZD4282; potassium channel openers; AMPA/kainate receptor antagonists; calcium channel blockers, such as ziconotide and NMED160; GABA-A receptor IO modulators (e.g., a GABA-A receptor agonist); matrix metalloprotease (MMP) inhibitors; thrombolytic agents; opioid analgesics such as codeine, fentanyl, hydromorphone, levorphanol, meperidine, methadone, morphine, oxycodone, oxymorphone, pentazocine, propoxyphene; neutrophil inhibitory factor (NIF); pramipexole, ropinirole; anticholinergics; amantadine; monoamine oxidase B15 ("MAO-B") inhibitors; 5HT receptor agonists or antagonists; mGlu5 antagonists, such as AZD9272; alpha agonists, such as AGN XX/YY; neuronal nicotinic agonists, such as ABT894; NMDA receptor agonists or antagonists, such as AZD4282; NKI antagonists; selective serotonin reuptake inhibitors ("SSRI") and/or selective serotonin and norepinephrine reuptake inhibitors ("SSNRI"), such as duloxetine; tricyclic antidepressant drugs, norepinephrine modulators; lithium; valproate; gabapentin; pregabalin; rizatriptan; zolmitriptan; naratriptan and sumatriptan.

The compounds of the present invention may be administered in combination with compounds useful for enhancing sleep quality and preventing and treating sleep disorders and sleep disturbances, including e.g., sedatives, hypnotics, anxiolytics, antipsychotics, antianxiety agents, antihistamines, benzodiazepines, barbiturates, cyclopyrrolones, orexin antagonists, alpha-1 antagonists, GABA agonists, 5HT-2 antagonists including 5HT-2A antagonists and 5HT-2A/2C antagonists, histamine antagonists including histamine H3 antagonists, histamine H3 inverse agonists, imidazopyridines, minor tranquilizers, melatonin agonists and antagonists, melatonergic agents, other orexin antagonists, orexin agonists, prokineticin agonists and antagonists, pyrazolopyrimidines, T-type calcium channel antagonists, triazolopyridines, and the like, such as: adinazolam, allobarbital, alonimid, alprazolam, amitriptyline, amobarbital, amoxapine, armodafinil, APD-125, bentazepam, benzoctamine, brotizolam, bupropion, busprione, butabarbital, butalbital, capromorelin, capuride, carbocloral, chloral betaine, chloral hydrate, chlordiazepoxide, clomipramine, clonazepam, cloperidone, clorazepate, clorethate, clozapine, conazepam, cyprazepam, desipramine, dexclamol, diazepam, dichloralphenazone, divalproex, diphenhydramine, doxepin, EMD-281014, eplivanserin, estazolam, eszopiclone, ethchlorynol, etomidate, fenobam, flunitrazepam, flurazepam, fluvoxamine, fluoxetine, fosazepam, gaboxadol, glutethimide, halazepam, hydroxyzine, ibutamoren, imipramine, indiplon, lithium, lorazepam, lormetazepam, LY-156735, maprotiline, MDL-100907, mecloqualone, melatonin, mephobarbital, meprobamate, methaqualone, methyprylon, midaflur, midazolam, modafinil, nefazodone, NGD-2-73, nisobamate, nitrazepam, nortriptyline, oxazepam, paraldehyde, paroxetine, pentobarbital, perlapine, perphenazine, phenelzine, phenobarbital, prazepam, promethazine, propofol, protriptyline, quazepam, ramelteon, reclazepam, roletamide, secobarbital, sertraline, suproclone, TAK-375, temazepam, thioridazine, tiagabine, tracazolate, tranylcypromaine, trazodone, triazolam, trepipam, tricetamide, triclofos, trifluoperazine, trimetozine, trimipramine, uldazepam, venlafaxine, zaleplon, zolazepam, zopiclone, zolpidem, and salts thereof, and combinations thereof, and the like, or the compound of the present invention may be administered in conjunction with the use of physical methods such as with light therapy or electrical stimulation.

Compounds of the instant invention are useful for the treatment of moderate to severe dementia of the Alzheimer's type alone or in combination with an NMDA receptor antagonist, such as memantine, or in combination with an acetylcholinesterase inhibitor (AChEI) such as donepezil.

Compounds of the instant invention are useful for the treatment of mild to moderate dementia of the Alzheimer's type alone or in combination with either galantamine, rivastigmine, or donepezil.

Compounds of the instant invention are useful for the treatment of dementia associated with Parkinson's disease alone or in combination with rivastigmine.

Compounds of the instant invention are useful for the treatment of motor fluctuations in patients with advanced Parkinson's disease alone or in combination with carbidopa and levodopa.

When administering a combination therapy of the invention to a patient, therapeutic agents in the combination, or a pharmaceutical composition or compositions comprising therapeutic agents, may be administered in any order such as, for example, sequentially, concurrently, together, simultaneously and the like. The amounts of the various actives in such combination therapy may be different amounts (different dosage amounts) or same amounts (same dosage amounts). A compound of the invention and an additional therapeutic agent may be present in fixed amounts (dosage amounts) in a single dosage unit (e.g., a capsule, a tablet and the like).

The α7 nAChR positive allosteric modulator (PAM) activity of the present compounds may be tested using assays known in the art. The α7 nAChR PAMs described herein have activities in an automated patch-clamp electrophysiology functional assay as described in the examples. The assay was performed using the IonFlux HT in a whole-cell, population patch configuration. See Golden et al. *Assay Drug Dev. Technol.* (2011) 9:608-619. The compounds were assessed for their ability to modulate the function of the human α7 nAChR stably expressed in a HEK cell line both in the presence, and in the absence of the natural α7 agonist acetylcholine. By performing a series of such measurements at different concentrations, the effective concentration of the α7 nAChR PAMs ($EC_{50}$) was determined. See Spencer et al. *Assay Drug Dev. Technol.* (2012) 10:313-324.

The present invention also includes processes for making compounds of formula I. The compounds of the present invention can be readily prepared according to the following reaction schemes and examples, or modifications thereof, using readily available starting materials, reagents and conventional synthesis procedures. In these reactions, it is also possible to make use of variants which are themselves known to those of ordinary skill in this art, but are not mentioned in greater detail. Furthermore, other methods for preparing compounds of the invention will be readily apparent to the person of ordinary skill in the art in light of the following reaction schemes and examples. Unless otherwise indicated, all variables are as defined above. The following reaction schemes and examples serve only to illustrate the invention and its practice.

Reaction Schemes

The compounds of the present invention can be prepared readily according to the following schemes and specific examples, or modifications thereof, using readily available starting materials, reagents and conventional synthetic procedures. In these reactions, it is also possible to make use of variants which are themselves known to those of ordinary skill in this art but are not mentioned in greater detail. The general procedures for making the compounds claimed in this invention can be readily understood and appreciated by one skilled in the art from viewing the following schemes.

Some compounds of the present invention may be prepared according to Scheme 1, in which acid 1.1 is reacted with CDI in dioxane and then treated with thiophenol 1.2 in dioxane at elevated temperature to afford benzothiazole 1.3. Other coupling reagents, such as EDC and HOAt, and solvents, such as toluene, can be employed in this transformation. If 1.3 is a mixture of enantiomers or diastereomers, the mixture may be separated by chiral chromatography. Alternatively, 1.1 and 1.2 may be employed as single enantiomers or diastereomers to obtain 1.3 enriched in a single enantiomer or diastereomer. Additionally, dehydrating reagents, such as PTSA, can be employed to complete the formation of the heterocycle. Further, if a benzoxazole product is desired instead of a benzothiazole, a suitable phenol may be used in place of thiophenol 1.2.

SCHEME 1

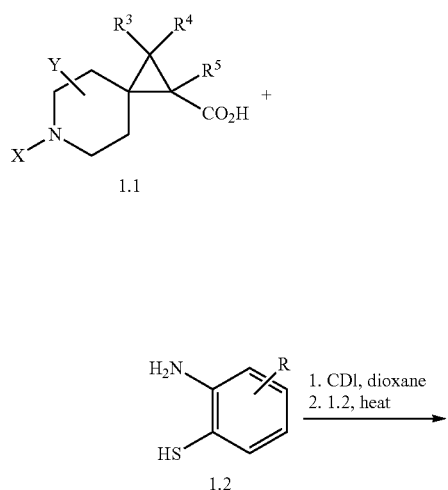

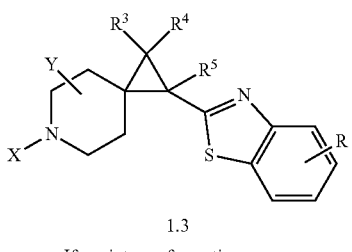

1.3

If a mixture of enantiomers or diastereomers, then:

Chiral resolution → mixture / single isomer

In addition, compounds of the present invention may be prepared according to Scheme 2, in which boronic ester (or boronate acid or boronic acid derivative) 2.1 is reacted with heteroaryl bromide (or chloride, iodide, triflate, or tosylate) 2.2 under palladium-catalyzed conditions to afford product 2.3. A variety of different catalysts (including other metals such as nickel), ligands, bases, and solvents can be employed in this reaction. Other six and five membered heteroaryl halides (such as a 3-bromo-1,2,4-thiadiazole) may be used in place of 2.2. Carbamate 2.3 is then treated with HCl to remove the Boc protecting group and the resulting piperidine reacted with sulfamide to afford product 2.4. Other sulfamylating reagents may be used in this transformation (e.g. tert-butyl (chlorosulfonyl)carbamate). If 2.4 is a mixture of enantiomers or diastereomers, the mixture may be separated by chiral chromatography. Alternatively, 2.1 and 2.2 may be employed as single enantiomers or diastereomers to obtain 2.4 enriched in a single enantiomer or diastereomer.

SCHEME 2

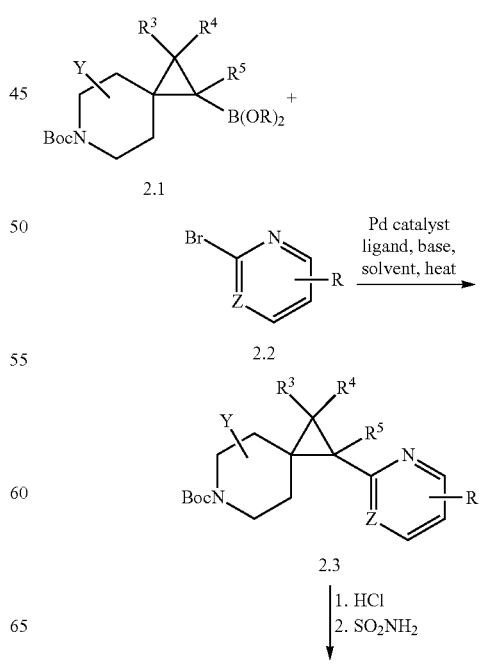

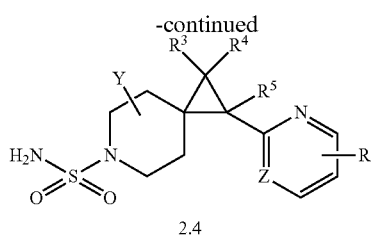

2.4

If a mixture of enantiomers or diastereomers, then:

Chiral resolution: mixture → single isomer

In addition, compounds of the present invention may be prepared according to Scheme 3, in which pyridyl chloride (or bromide, iodide, triflate, or tosylate) 3.1 is reacted with aryl boronic ester (or boronate acid or boronic acid derivative) 3.2 under palladium-catalyzed conditions to afford product 3.3. A variety of different catalysts (including other metals such as nickel), ligands, bases, and solvents can be employed in this reaction. Additionally, heteroaryl, alkyl, or vinyl boronates can be employed in place of aryl boronate 3.2. Carbamate 3.3 is then treated with HCl to remove the Boc protecting group and the resulting piperidine reacted with sulfamide to afford product 3.4. Other sulfamylating reagents may be used in this transformation (e.g. tert-butyl (chlorosulfonyl)carbamate).

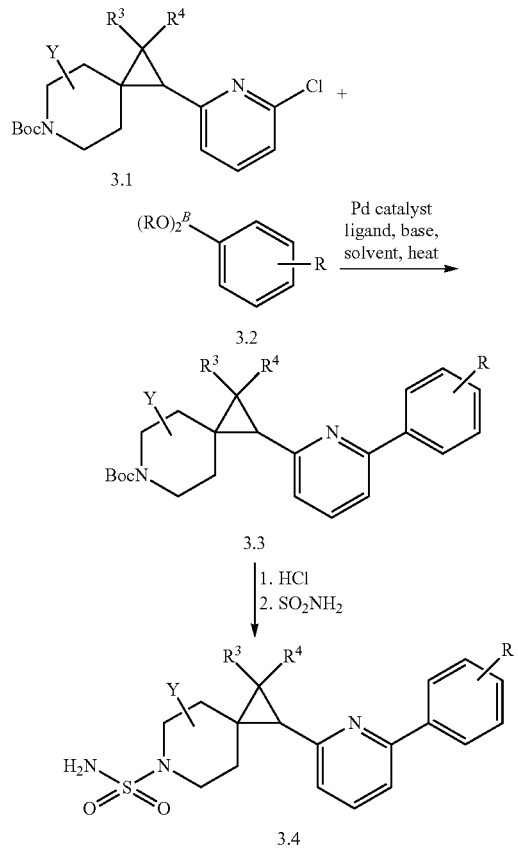

Intermediates like 4.6 of the present invention may be prepared according to Scheme 4, which starts with Wittig olefination of ketone 4.1 by reaction with phosphorane 4.2 at elevated temperature to afford product 4.3. α,β-Unsaturated ester 4.3 is then reacted with the ylide formed by treating precursor 14.4 with sodium hydride to afford cyclopropane 4.5. Other bases, such as potassium tert-butoxide, may be employed in this transformation. Alternatively, 4.1 can be converted to the corresponding terminal olefin by treatment with methylenetriphenylphosphorane and then reacted with ethyl diazoacetate in the presence of a rhodium, copper, or palladium catalyst to form the ethyl ester analogue of compound 4.5. Tri- and tetrasubstituted olefins can be employed in this latter transformation to afford cyclopropanes with a higher degree of substitution. Chiral ligands may be employed in these carbene insertion reactions (such as (R,R)-(−)-2,2'-isopropylidenebis(4-tert-butyl-2-oxazoline), used in the presence of copper(I) triflate) to afford enantio- or diastereoenriched products. Cyclopropane 4.5 is then saponified by treatment with sodium hydroxide to afford acid 4.6.

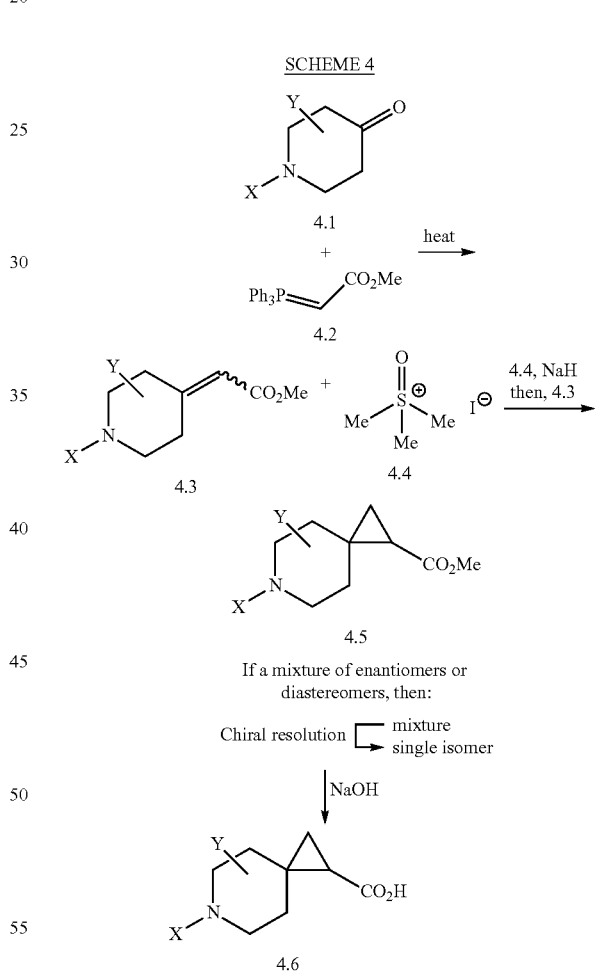

Intermediates like 5.5 of the present invention may be prepared according to Scheme 5, which starts with reduction of α,β-unsaturated ester 4.3 by treatment with DIBAL followed by conversion of the resulting allylic alcohol to the corresponding acetate 5.1 by reaction with acetic anhydride in the presence of DMAP and triethylamine. Other reducing reagents, acetylating reagents, and bases may be used in this transformation. Allylic acetate 5.1 can then be difluorocyclopropanated by treatment with (trimethylsilyl)trifluoromethane in the presence of sodium iodide to afford difluorocyclopropane 5.2. Other difluorocarbene sources (such as (bromodifluoromethyl)trimethylsilane or sodium chlorodifluoroacetate) and initiators (such as tetralkylammonium salts) may be employed in this transformation. Removal of the acetate group of 5.2 can be accomplished by treatment with potassium carbonate and the resulting alcohol oxidized to the corresponding acid by reaction with TEMPO. This acid can then be converted to benzyl ester 5.3 by treatment with benzyl bromide. Ester 5.3 can then be treated with HCl to remove the Boc group and the resulting piperidine reaction with sulfamide to afford product 5.4. Removal of the benzyl ester can be accomplished by treatment with palladium on carbon in the presence of hydrogen to give acid 5.5.

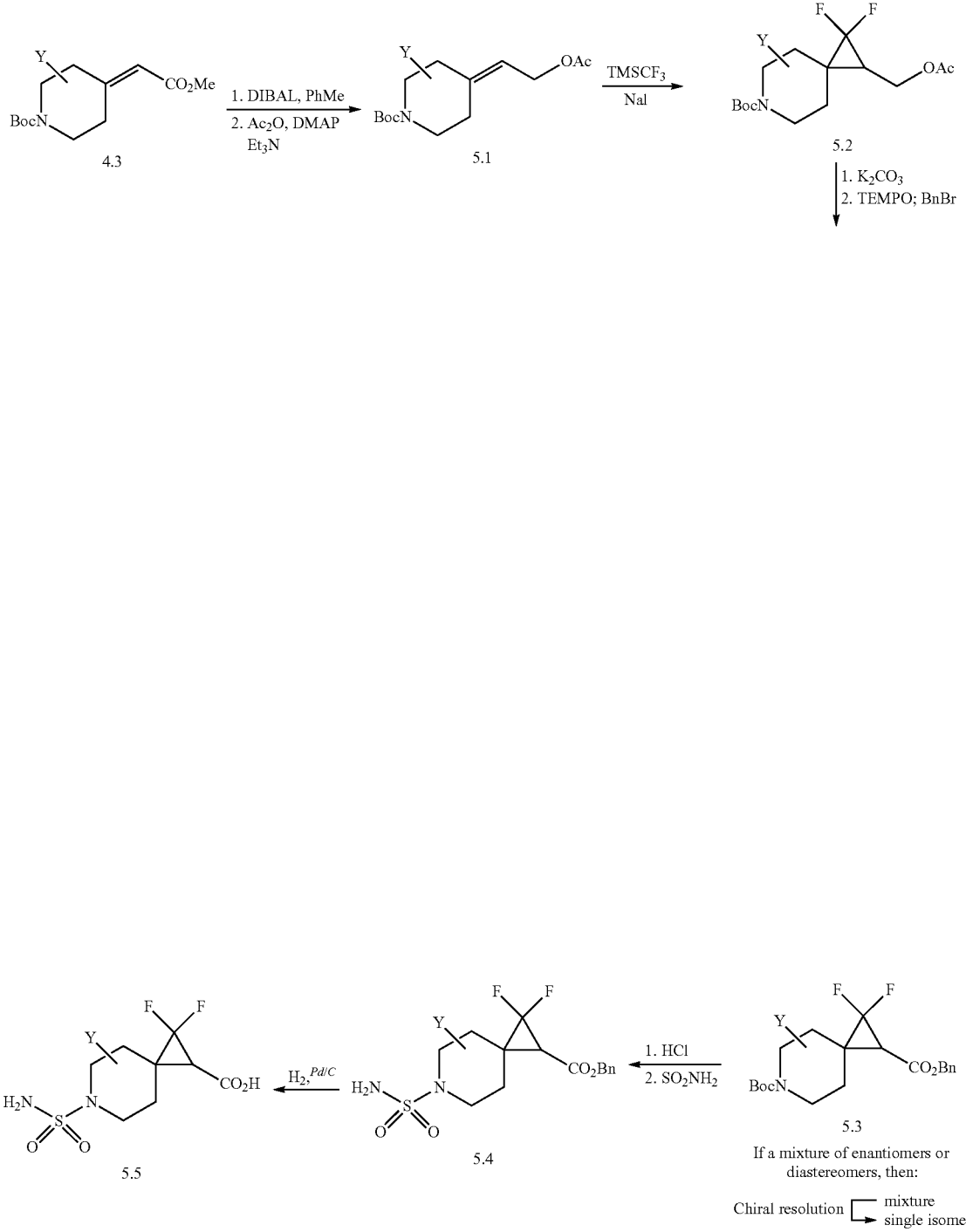

Intermediates like 6.4 in the present invention may be prepared according to Scheme 6, which begins with treatment of triphenylphosphonium bromide 6.1 with n-butyllithium and reaction of the resultant ylide with piperidinone 4.1 to afford alkene 6.2. Alkene 6.2 can then be reacted with ethyl diazoacetate in the presence of rhodium acetate to afford cyclopropane 6.3. Other metals, such as copper or palladium, may be used in this transformation. Chiral ligands may be employed in these carbene insertion reactions (such as (R,R)-(−)-2,2'-isopropylidenebis(4-tert-butyl-2-oxazoline), used in the presence of copper(I) triflate) to afford enantio- or diastereoenriched products. Cyclopropane 6.3 is then saponified by treatment with sodium hydroxide to afford acid 6.4.

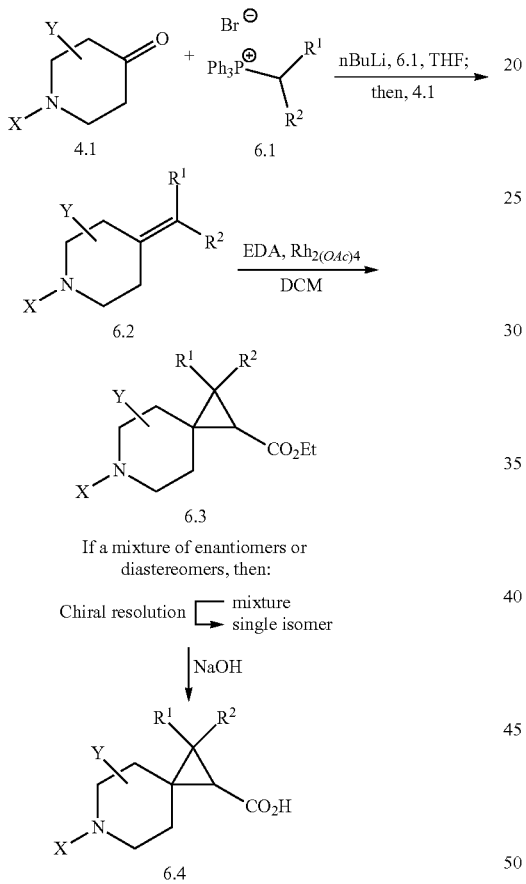

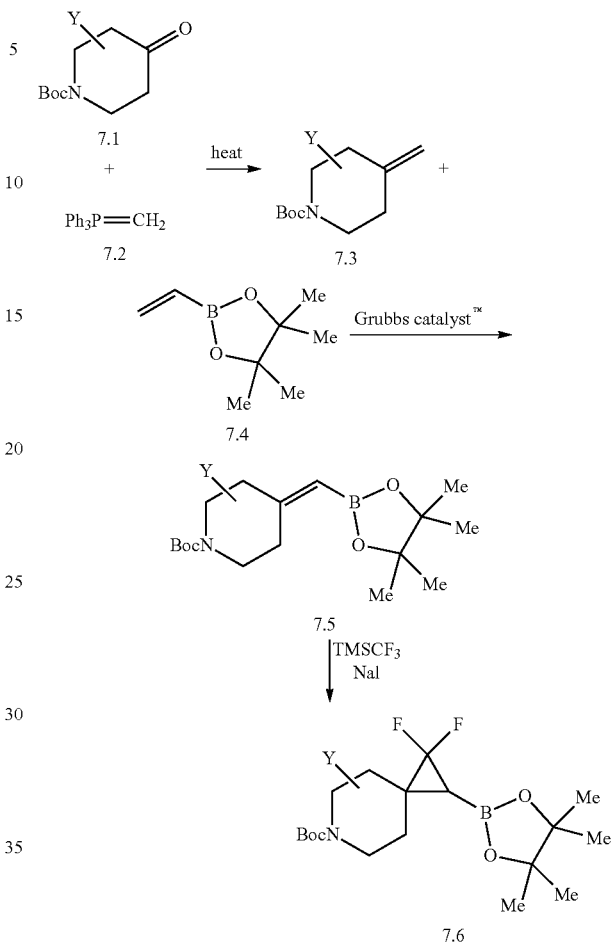

Intermediates like 7.6 of the present invention may be prepared according to Scheme 7, which begins with Wittig olefination of ketone 7.1 by reaction with phosphorane 7.2 at elevated temperature to afford terminal olefin 7.3. Alkene 7.3 is then reacted with vinyl boronate 7.4 in the presence of Grubbs' Catalyst™, 2$^{nd}$ generation, to give vinyl boronate 7.5. Other cross-methathesis catalysts (such as Zhan's catalyst or Hoveyda-Grubbs catalyst) can be employed in this transformation. Vinyl boronate 7.5 can then be difluorocyclopropanated by treatment with (trimethylsilyl)trifluoromethane in the presence of sodium iodide to afford difluorocyclopropane 7.6. Other difluorocarbene sources (such as (bromodifluoromethyl)trimethylsilane or sodium chlorodifluoroacetate) and initiators (such as tetraalkylammonium salts) may be employed in this transformation.

Intermediates like 3.1 of the present invention may be prepared according to Scheme 8, which begins with treatment of triphenylphosphonium chloride 8.1 with n-butyllithium and reaction of the resultant ylide with piperidinone 7.1 to afford vinyl pyridine 8.2. Reaction of vinyl pyridine 8.2 with an in situ generated dialkyl or dihalocarbene or metal carbenoid can then afford cyclopropane 3.1.

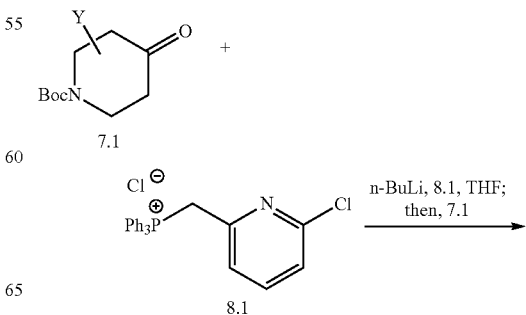

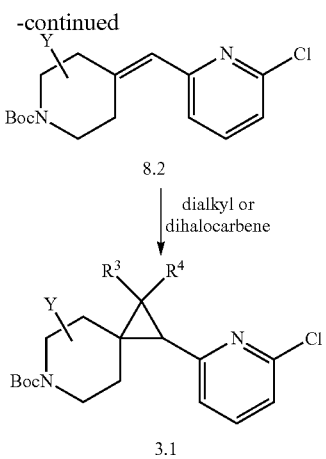

The following abbreviations are used throughout the text:

| | |
|---|---|
| Ac | acetyl |
| AIBN | 2,2'-azobisisobutyronitrile |
| Aq | aqueous |
| Ar | aryl |
| $B_2(Pin)_2$ | bis(pinacolato)diboron |
| BINAP | 2,2'-bis(diphenylphosphino)-1,1'-binaphthalene |
| Bn | benzyl |
| Boc | tert-butoxycarbonyl |
| BOP | (benzotriazol-1-yloxy)tris(dimethylamino)phosphonium hexafluorophosphate |
| br | broad |
| BSA | bovine serum albumin |
| Bu | butyl |
| Ca | circa (approximately) |
| CAN | ammonium cerium(IV) nitrate |
| Cbz | carboxybenzyl |
| CDI | 1,1'-carbonyldiimidazole |
| d | doublet |
| DABCO | diazabicyclo[2.2.2]octane |
| DAST | (diethylamino)sulfur trifluoride |
| dba | dibenzylideneacetone |
| DBU | 1,8-diazabicyclo[5.4.0]undec-7-ene |
| DCE | 1,2-dichloroethane |
| DCM | dichloromethane |
| dd | doublet of doublets |
| DIBAL (DIBAL-H) | diisobutylaluminum hydride |
| DIEA | N,N-diisopropylethylamine |
| DMA | N,N-dimethylacetamide |
| DMAP | 4-(dimethylamino)pyridine |
| DMEM | dulbecco's modified eagle medium (high glucose) |
| DMF | N,N-dimethylformamide |
| DMF-DMA | N,N-dimethylformamide dimethylacetal |
| Dess-Martin periodinane (DMP) | 1,1,1-Tris(acetyloxy)-1,1-dihydro-1,2-benziodoxol-3-(1H)-one |
| DMPU | N,N'-dimethylpropyleneurea |
| DMSO | dimethylsulfoxide |
| DPBF | 1,3-diphenylisobenzofuran |
| dppf | 1,1'-bis(diphenylphosphino)ferrocene |
| EDC | N-(3-dimethylaminopropyl)-N'-ethylcarbodiimide hydrochloride |
| EDTA | ethylenediaminetetraacetic acid |
| Eq | equivalents |
| ESI | electrospray ionization |
| Et | ethyl |
| FBS | fetal bovine serum |
| h | hours |
| HATU | O-(7-azabenzotri azol-1-yl)-N,N,N'N'-tetramethyluronium hexafluorophosphate |
| HEPES | N-(2-hydroxyethyl)piperazine-N'-(2-ethanesulfonic acid) |
| HMDS | hexamethyldisilazane |
| HMTA | hexamethylenetetramine |
| HOAt | 1-hydroxy-7-azabenzotriazole |
| HOBt | 1-hydroxybenzotriazole |
| HPLC | high performance liquid chromatography |
| Hz | hertz |
| imid | imidazole |
| i-Pr | isopropyl |
| J | coupling constant |
| LAH | lithium aluminum hydride |
| LCMS | liquid chromatography-mass spectrometry |
| LDA | lithium diisopropylamide |
| m/z | mass to charge ratio |
| m | multiplet |
| mCPBA | 3-chloroperbenzoic acid |
| Me | methyl |
| min | minutes |
| MP | macroporous polystyrene |
| Ms | methanesulfonyl |
| MTBE | methyl tert-butyl ether |
| MW | molecular weight |
| NBS | N-bromosuccinimide |
| NHS | N-hydroxy succinimide |
| n-BuLi | n-butyllithium |
| n-HexLi | n-hexyllithium |
| NMM | N-methyl morpholine |
| NMP | 1-methyl-2-pyrrolidinone |
| NMR | nuclear magnetic resonance |
| OAc | acetate |
| P | pentet |
| PBPB | pyridinium bromide perbromide |
| PBS | phosphate-buffered saline |
| PCC | pyridinium chlorochromate |
| PDC | pyridinium dichromate |
| Pd/C | palladium on carbon |
| Ph | phenyl |
| PIFA | [bis(trifluoroacetoxy)iodo]benzene |
| PMBCl | 4-methoxybenzyl chloride |
| Psi | pounds per square inch |
| p-Ts | 4-toluenesulfonyl |
| PTSA | para-toluensulfonic acid |
| Py | pyridyl |
| q | quartet |
| Rt | room temperature |
| s | singlet |
| SEM | 2-trimethylsilylethoxymethyl |
| SEMCl | 2-trimethylsilylethoxymethyl chloride |
| SFC | supercritical fluid chromatography |
| SM | starting material |
| t | triplet |
| T3P | 2,4,6-tripropyl-1,3,5,2,4,6-trioxatriphosphorinane-2,4,6-trioxide |
| TBAF | n-tetrabutylammonium fluoride |
| TBAI | n-tetrabutylammonium iodide |
| TBS | tert-butyldimethyl silyl |
| TBSCl | tert-butyldimethylsilyl chloride |
| TBDPS | tert-butyldiphenylsilyl |
| TBDPSCl | tert-butyldiphenylsilyl chloride |
| t-Bu | tert-butyl |
| TCCA | trichloroisocyanuric acid |
| TEA | trimethylamine |
| TFA | trifluoroacetic acid |
| Tf | trifluoromethanesulfonyl |
| TCFH | tetramethylchloroformamidinium hexafluorophosphate |
| THF | tetrahydrofuran |
| TMG | tetramethylguanidine |
| TMSD | trimethylsilyldiazomethane |
| Trisyl | 2,4,6-triisopropylbenzenesulfonyl |
| V/V | volume to volume |
| X-Phos | 2-dicyclohexylphosphino-2',4',6'-triisopropylbiphenyl |

Intermediate 1

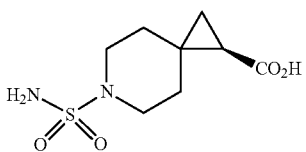

(1R)-6-Sulfamoyl-6-azaspiro[2.5]octane-1-carboxylic acid (I1)

Step A: Ethyl (1R)-6-azaspiro[2.5]octane-1-carboxylate (I1a)

To a solution of 6-benzyl 1-ethyl (1R)-6-azaspiro[2.5]octane-1,6-dicarboxylate (44.6 g, 141 mmol) (Brown et al. J. Med. Chem. (2014) 57:733-758) in methanol (400 mL) was added palladium hydroxide (20% w/w, on activated carbon, 4.94 g, 7.03 mmol). The reaction vessel was evacuated and backfilled with hydrogen (ca. 1 atm) and the reaction mixture was allowed to stir at ambient temperature for 18 h. The reaction mixture was filtered through a pad of Celite®, washing with methanol, and the filtrate was concentrated under reduced pressure to afford compound (I1a) in sufficient purity for use in the next step. MS: m/z=184.3 [M+H].

Step B: Ethyl (1R)-6-sulfamoyl-6-azaspiro[2.5]octane-1-carboxylate (I1b)

To a solution of ethyl (1R)-6-azaspiro[2.5]octane-1-carboxylate (I1a, 25.6 g, 140 mmol) in 1,4-dioxane (400 mL) was added sulfamide (40.7 g, 423 mmol) and the reaction mixture warmed to 95° C. and allowed to stir for 18 h. Sulfamide (9.00 g, 93.7 mmol) was added and the reaction mixture was warmed to 100° C. and allowed to stir for 6 h. The reaction mixture was allowed to cool to ambient temperature, poured into a saturated aqueous solution of sodium bicarbonate, and extracted with ethyl acetate (2×). The combined organic extracts were washed with a saturated aqueous solution of sodium chloride, dried (sodium sulfate) and filtered and the filtrate was concentrated under reduced pressure. The crude residue was purified by silica gel chromatography, eluting with a gradient of methanol:dichloromethane—0:100 to 5:95 to afford compound I1b. MS: m/z=263.1 [M+H].

Step C: (1R)-6-Sulfamoyl-6-azaspiro[2.5]octane-1-carboxylic acid (I1)

To a solution of ethyl (1R)-6-sulfamoyl-6-azaspiro[2.5]octane-1-carboxylate (I1b, 50.0 g, 191 mmol) in tetrahydrofuran (270 mL) and methanol (135 mL) was added an aqueous solution of sodium hydroxide (2 M, 286 mL, 572 mmol) and the reaction mixture was allowed to stir for 2 days at ambient temperature. The reaction mixture was diluted with ice water (200 mL) and the resulting mixture slowly adjusted to pH=5 with an aqueous solution of hydrochloric acid (12 M) and extracted with ethyl acetate (3×). The combined organic extracts were washed with a saturated aqueous solution of sodium chloride, dried (sodium sulfate), and filtered and the filtrate was concentrated under reduced pressure to afford compound I1 in sufficient purity for use in the next step. MS: m/z=235.1 [M+H].

Intermediate 2

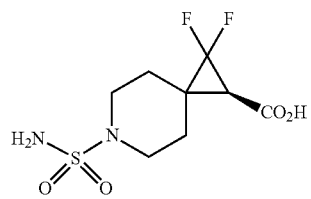

(1R)-2,2-Difluoro-6-sulfamoyl-6-azaspiro[2.5]octane-1-carboxylic acid (I2)

Step A: tert-Butyl 4-(2-methoxy-2-oxoethylidene)piperidine-1-carboxylate (I2a)

To a solution of tert-butyl 4-oxopiperidine-1-carboxylate (8.40 g, 42.2 mmol) in toluene (100 mL) was added methyl 2-(triphenylphosphoranylidene)acetate (17.6 g, 52.7 mmol) and the reaction mixture was warmed to 110° C. and allowed to stir for 4 h. The reaction mixture was cooled to ambient temperature and concentrated under reduced pressure. Hexanes were added to the residue and the resulting mixture filtered, washing with hexanes, and the filtrate was concentrated under reduced pressure. The residue was purified by silica gel chromatography, eluting with a gradient of hexanes:ethyl acetate—100:0 to 50:50 to afford compound I2a. MS: m/z=200.1 [M-tBu+H].

Step B: tert-Butyl 4-(2-hydroxyethylidene)piperidine-1-carboxylate (I2b)

To a solution of tert-butyl 4-(2-methoxy-2-oxoethylidene)piperidine-1-carboxylate (I2a, 7.54 g, 29.5 mmol) in tetrahydrofuran (60 mL) at −78° C. was added a solution of diisobutylammonium hydride in tetrahydrofuran (1 M, 60.0 mL, 60.0 mmol) dropwise and the reaction mixture was allowed to stir for 1 h at −78° C. The reaction mixture was allowed to warm to 0° C. and stir for 1 h. A solution of diisobutylammonium hydride in tetrahydrofuran (1 M, 40.0 mL, 40.0 mmol) was added dropwise and the reaction mixture was allowed to stand at 0° C. for 18 h. An aqueous solution of Rochelle's salt (0.5 M) was added slowly and the resulting mixture was diluted with water and extracted with ethyl acetate (2×). The combined organic extracts were washed with a saturated aqueous solution of sodium chloride, dried (magnesium sulfate) and filtered and the filtrate was concentrated under reduced pressure to afford compound I2b in sufficient purity for use in the next step. MS: m/z=195.2 [M+Na-tBu].

Step C: tert-Butyl 4-(2-acetoxyethylidene)piperidine-1-carboxylate (I2c)

To a solution of tert-butyl 4-(2-hydroxyethylidene)piperidine-1-carboxylate (I2b, 5.80 g, 25.5 mmol) in dichloromethane (100 mL) were added pyridine (4.13 mL, 51.0 mmol), 4-dimethylaminopyridine (0.312 g, 2.55 mmol), and acetic anhydride (4.82 mL, 51.0 mmol) sequentially and the reaction mixture was allowed to stir for 2 h at ambient temperature. The reaction mixture was concentrated under reduced pressure and the residue was purified by silica gel chromatography, eluting with a gradient of hexanes:ethyl acetate—100:0 to 25:75 to afford compound I2c. MS: m/z=292.2 [M+Na].

Step D: tert-Butyl 2-(acetoxymethyl)-1,1-difluoro-6-azaspiro[2.5]octane-6-carboxylate (I2d)

To a solution of tert-butyl 4-(2-acetoxyethylidene)piperidine-1-carboxylate (I2c, 3.23 g, 12.0 mmol) in tetrahydrofuran (30 mL) in a sealable vessel under an atmosphere of nitrogen were added sodium iodide (0.899 g, 6.00 mmol) and trimethyl(trifluoromethyl)silane (4.43 mL, 30.0 mmol) sequentially. The vessel was sealed and the reaction mixture was warmed to 90° C. and allowed to stir for 2 h. The reaction mixture was cooled to ambient temperature, sodium iodide (0.899 g, 6.00 mmol) and trimethyl(trifluoromethyl)silane (4.43 mL, 30.0 mmol) were added, and the reaction mixture was warmed to 90° C. and allowed to stir for 2 h. The reaction mixture was allowed to cool to ambient temperature, diluted with water, and the resulting mixture extracted with ethyl acetate. The organic layer was concentrated under reduced pressure and the residue was purified by silica gel chromatography, eluting with a gradient of hexanes:ethyl acetate—100:0 to 50:50 to afford compound I2d. MS: m/z=264.1 [M-tBu+H].

Step E: tert-Butyl 1,1-difluoro-2-(hydroxymethyl)-6-azaspiro[2.5]octane-6-carboxylate (I2e)

To a solution of tert-butyl 2-(acetoxymethyl)-1,1-difluoro-6-azaspiro[2.5]octane-6-carboxylate (I2d, 5.68 g, 17.8 mmol) in methanol (50 mL) was added potassium carbonate (7.37 g, 53.4 mmol) and the reaction mixture was allowed to stir for 2 h at ambient temperature. The reaction mixture was filtered, washing with methanol, and the filtrate was concentrated under reduced pressure. Ethyl acetate and water were added, the layers separated, and the aqueous layer was adjusted to pH=5 and extracted with ethyl acetate. The organic extract was dried (magnesium sulfate) and filtered and the filtrate was concentrated under reduced pressure to afford compound I2e in sufficient purity for use in the next step. MS: m/z=222.1 [M-tBu+H].

Step F: 6-(tert-Butoxycarbonyl)-2,2-difluoro-6-azaspiro[2.5]octane-1-carboxylic acid (I2f)

To a solution of tert-butyl 1,1-difluoro-2-(hydroxymethyl)-6-azaspiro[2.5]octane-6-carboxylate (I2e, 4.93 g, 17.9 mmol) in acetonitrile (100 mL) were added 4-methylmorpholine-4-oxide hydrate (24.0 g, 178 mmol) and tetrapropylammonium perruthenate (0.625 g, 1.78 mmol) sequentially and the reaction mixture was allowed to stir for 2 h at ambient temperature. The reaction mixture was diluted with an aqueous solution of hydrochloric acid (1 M) and extracted with ethyl acetate. The aqueous layer was diluted with water and a saturated aqueous solution of sodium chloride, extracted with ethyl acetate, and the combined organic extracts filtered over a pad of Celite® and concentrated under reduced pressure to afford compound I2f in sufficient purity for use in the next step. MS: m/z=236.1 [M-tBu+H].

Step G: 1-Benzyl 6-tert-butyl 2,2-difluoro-6-azaspiro[2.5]octane-1,6-dicarboxylate (I2g)

To a solution of 6-(tert-butoxycarbonyl)-2,2-difluoro-6-azaspiro[2.5]octane-1-carboxylic acid (I2f, 5.18 g, 17.9 mmol) in N,N-dimethylformamide (100 mL) were added HATU (10.1 g, 26.7 mmol), benzyl alcohol (2.77 mL, 26.7 mmol), and diisopropylethylamine (9.32 mL, 53.3 mmol) sequentially and the reaction mixture was allowed to stir for 1 h at ambient temperature. The reaction mixture was diluted with water and extracted with ethyl acetate (2×). The combined organic extracts were dried (magnesium sulfate) and filtered and the filtrate was concentrated under reduced pressure. The residue was purified by silica gel chromatography, eluting with a gradient of hexanes:ethyl acetate—100:0 to 50:50 to afford compound I2g. MS: m/z=326.2 [M-tBu+H].

Step H: Benzyl 2,2-difluoro-6-azaspiro[2.5]octane-1-carboxylate hydrochloride (I2h)

To a solution of 1-benzyl 6-tert-butyl 2,2-difluoro-6-azaspiro[2.5]octane-1,6-dicarboxylate (I2g, 4.70 g, 12.3 mmol) in ethyl acetate (25 mL) was added a solution of hydrogen chloride in 1,4-dioxane (4 M, 12.3 mL, 49.3 mmol) and the reaction mixture was allowed to stir for 18 h at ambient temperature. The reaction mixture was concentrated under reduced pressure to afford compound I2h in sufficient purity for use in the next step. MS: m/z=282.2 [M+H].

Step I: (1R)-Benzyl 2,2-difluoro-6-sulfamoyl-6-azaspiro[2.5]octane-1-carboxylate (I2i)

To a solution of benzyl 2,2-difluoro-6-azaspiro[2.5]octane-1-carboxylate hydrochloride (I2h, 3.92 g, 12.3 mmol) in 1,4-dioxane (60 mL) were added triethylamine (2.58 mL, 18.5 mmol) and sulfamide (3.56 g, 37.0 mmol) and the reaction mixture was warmed to 90° C. and allowed to stir for 4 h. The reaction mixture was cooled to ambient temperature and sulfamide (3.56 g, 37.0 mmol) was added. The reaction mixture was warmed to 90° C. and allowed to stir for 4 h. The reaction mixture was concentrated under reduced pressure and ethyl acetate and water were added to the residue. The aqueous layer was extracted with ethyl acetate and the combined organic extracts were dried (magnesium sulfate) and filtered and the filtrate was concentrated under reduced pressure. The residue was purified by silica gel chromatography, eluting with a gradient of hexanes:ethyl acetate:ethanol—100:0:0 to 52:36:12 to afford the racemic mixture of the title compound. The racemate was resolved by SFC, utilizing a ChiralPak AD-H column and eluting with methanol:carbon dioxide—40:60. The first major peak to elute was (1R)-benzyl 2,2-difluoro-6-sulfamoyl-6-azaspiro[2.5]octane-1-carboxylate, (I2i), and the second major peak to elute was (1S)-benzyl 2,2-difluoro-6-sulfamoyl-6-azaspiro[2.5]octane-1-carboxylate (I2is). MS: m/z=361.2 [M+H].

Step J: (1R)-2,2-Difluoro-6-sulfamoyl-6-azaspiro[2.5]octane-1-carboxylic acid (I2)

To a vessel containing (1R)-benzyl 2,2-difluoro-6-sulfamoyl-6-azaspiro[2.5]octane-1-carboxylate (I2i, 1.20 g, 3.33 mmol) was added palladium on activated carbon (10% w/w, 0.354 g, 0.333 mmol) under an inert atmosphere. Methanol (17 mL) was added and the reaction mixture was placed under an atmosphere of hydrogen (ca. 1 atm) and allowed to stir for 3 h at ambient temperature. The reaction mixture was filtered over a pad of Celite®, washing with methanol, and the filtrate was concentrated under reduced pressure to afford the title compound I2 in sufficient purity for use in the next step. MS: m/z=271.1 [M+H].

Intermediate 3

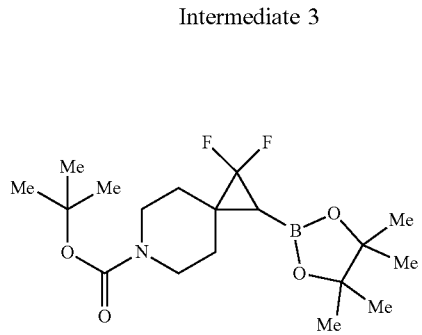

tert-Butyl 1,1-difluoro-2-(4,4,5,5-tetramethyl-1,3,2-dioxaborolan-2-yl)-6-azaspiro[2.5]octane-6-carboxylate (I3)

Step A: tert-Butyl 4-[(4,4,5,5-tetramethyl-1,3,2-dioxaborolan-2-yl)methylidene]piperidine-1-carboxylate (I3a)

To a solution of 4,4,5,5-tetramethyl-2-vinyl-1,3,2-dioxaborolane (7.03 g, 45.6 mmol) in toluene (60 mL) were added tert-butyl 4-methylenepiperidine-1-carboxylate (3.0 g, 15.2 mmol) and dichloro[1,3-bis(2,4,6-trimethylphenyl)-2-imidazolidinylidene][[5-[(dimethylamino)sulfonyl]-2-(1-methylethoxy-O)phenyl]methylene-C]ruthenium(II) (0.56 g, 0.76 mmol) and the reaction mixture was warmed to 90° C. and allowed to stir for 3 h. The reaction mixture was cooled to ambient temperature and water (20 mL) added and the resulting mixture extracted with ethyl acetate (3×30 mL). The combined organic extracts were washed with a saturated aqueous solution of sodium chloride (20 mL), dried (sodium sulfate), and filtered and the filtrate was concentrated under reduced pressure. The residue was purified by silica gel chromatography, eluting with a gradient of petroleum ether:ethyl acetate—95:5 to 90:10 to afford compound I3a. MS: m/z=224.1 [M-100+H].

Step B: tert-Butyl 1,1-difluoro-2-(4,4,5,5-tetramethyl-1,3,2-dioxaborolan-2-yl)-6-azaspiro[2.5]octane-6-carboxylate (I3)

To a solution of tert-butyl 4-((4,4,5,5-tetramethyl-1,3,2-dioxaborolan-2-yl)methylene)piperidine-1-carboxylate (I3a, 1.00 g, 3.09 mmol) in tetrahydrofuran (10 mL) were added trimethyl(trifluoromethyl)silane (4.40 g, 30.9 mmol) and sodium iodide (0.23 g, 1.6 mmol) and the reaction mixture was warmed to 120° C. and allowed to stir for 12 h. The reaction mixture was allowed to cool to ambient temperature, water (15 mL) was added and the resulting mixture extracted with ethyl acetate (3×15 mL). The combined organic extracts were washed with a saturated aqueous solution of sodium chloride (20 mL), dried (sodium sulfate), and filtered and the filtrate was concentrated under reduced pressure. The residue was purified by silica gel chromatography, eluting with a gradient of petroleum ether:ethyl acetate—100:0 to 80:20 to afford the title compound I3. MS: m/z=359.2 [M-tBu+CH₃CN+H].

Intermediate 4

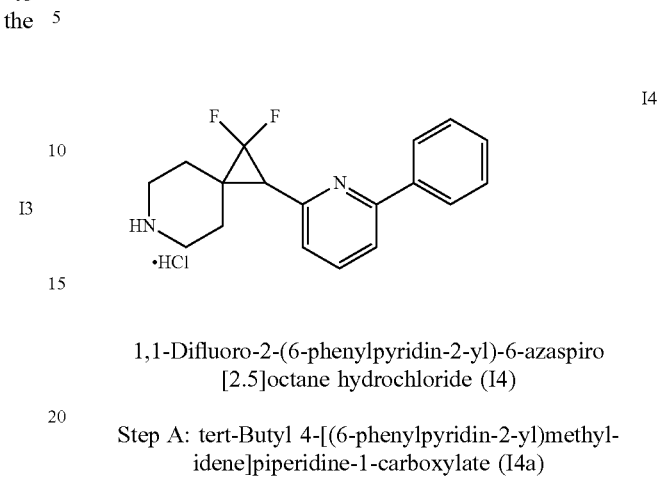

1,1-Difluoro-2-(6-phenylpyridin-2-yl)-6-azaspiro[2.5]octane hydrochloride (I4)

Step A: tert-Butyl 4-[(6-phenylpyridin-2-yl)methylidene]piperidine-1-carboxylate (I4a)

To a solution of tert-butyl 4-[(4,4,5,5-tetramethyl-1,3,2-dioxaborolan-2-yl)methylidene]piperidine-1-carboxylate (100 mg, 0.309 mmol) in tetrahydrofuran (0.70 mL) were added 2-bromo-6-phenylpyridine (109 mg, 0.464 mmol), chloro(2-dicyclohexylphosphino-2',4',6'-triisopropyl-1,1'-biphenyl)(2'-amino-1,1'-biphenyl-2-yl) palladium(II) (5.1 mg, 6.5 μmol), and an aqueous solution of potassium phosphate (0.5 M, 1.20 mL, 0.600 mmol) and the reaction mixture was allowed to stir for 18 h at ambient temperature. The reaction mixture was warmed to 65° C. and allowed to stir for 1 h. The reaction mixture was cooled to ambient temperature and a saturated aqueous solution of ammonium chloride (5 mL) was added and the resulting mixture extracted with ethyl acetate (3×5 mL). The combined organic extracts were washed with a saturated aqueous solution of sodium chloride (1×15 mL), dried (magnesium sulfate) and filtered and the filtrate was concentrated under reduced pressure. The residue was purified by silica gel chromatography, eluting with a gradient of hexanes:ethyl acetate—97:3 to 77:23 to afford compound I4a. MS: m/z=351.3 [M+H].

Step B: tert-Butyl 1,1-difluoro-2-(6-phenylpyridin-2-yl)-6-azaspiro[2.5]octane-6-carboxylate (I4b)

To a solution of tert-butyl 4-[(6-phenylpyridin-2-yl)methylidene]piperidine-1-carboxylate (I4a, 30 mg, 0.086 mmol) in tetrahydrofuran (0.30 mL) were added sodium iodide (13 mg, 0.087 mmol) and (trifluoromethyl)trimethylsilane (0.063 mL, 0.429 mmol) sequentially and the reaction mixture was warmed to 80° C. and allowed to stir for 5 h. (Trifluoromethyl)trimethylsilane (0.127 mL) was added and the reaction mixture allowed to stir for 22 h. The reaction mixture was warmed to 100° C. and allowed to stir for 12 h. The reaction mixture was cooled to ambient temperature and a saturated aqueous solution of sodium chloride (5 mL) was added and the resulting mixture extracted with ethyl acetate (3×5 mL). The combined organic extracts were washed with a saturated aqueous solution of sodium chloride (1×5 mL), dried (magnesium sulfate), and filtered and the filtrate was concentrated under reduced pressure. The residue was purified by silica gel chromatography, eluting with a gradient of dichloromethane:ethyl acetate—100:0 to 97:3 to afford compound I4b. MS: m/z=401.3 [M+H].

Step C: 1,1-Difluoro-2-(6-phenylpyridin-2-yl)-6-azaspiro[2.5]octane hydrochloride (I4)

To a vessel containing tert-butyl 1,1-difluoro-2-(6-phenylpyridin-2-yl)-6-azaspiro[2.5]octane-6-carboxylate (I4b, 18.9 mg, 0.019 mmol) in 1,4-dioxane (0.40 mL) was added a solution of HCl in 1,4-dioxane (4 M, 0.094 mL, 0.38 mmol) and the reaction mixture allowed to stir for 18 h at ambient temperature. The reaction mixture was concentrated under a stream of nitrogen gas to afford compound I4 in sufficient purity for use in the next step. MS: m/z=301.2 [M+H].

Intermediate 5

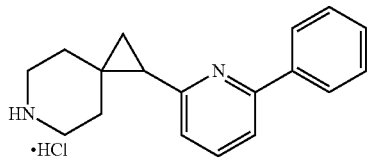 [SMILES: c1ccc(-c2cccc(C3CC34CCNCC4)n2)cc1 ; Cl]

1-(6-Phenylpyridin-2-yl)-6-azaspiro[2.5]octane hydrochloride (I5)

Step A: tert-Butyl 1,1-dichloro-2-(6-phenylpyridin-2-yl)-6-azaspiro[2.5]octane-6-carboxylate (I5a)

To a solution of tert-butyl 4-[(6-phenylpyridin-2-yl)methylidene]piperidine-1-carboxylate (described in Intermediate 4, I4b) (70 mg, 0.20 mmol) in chloroform (1.00 mL) were added an aqueous solution of sodium hydroxide (50% w/w, 0.192 mL, 3.60 mmol) and tetrabutylammonium bromide (3.2 mg, 0.0099 mmol) and the reaction mixture was allowed to stir for 18 h at ambient temperature. The reaction mixture was added to a saturated aqueous solution of ammonium chloride (5 mL) and the resulting mixture extracted with dichloromethane (3×5 mL). The combined organic extracts were washed with a saturated aqueous solution of sodium chloride (1×5 mL), dried (magnesium sulfate), and filtered and the filtrate was concentrated under reduced pressure. The residue was purified by silica gel chromatography, eluting with a gradient of hexanes:ethyl acetate—100:0 to 90:10 to afford compound I5a. MS: m/z=433.1 [M+H].

Step B: tert-Butyl 1-(6-phenylpyridin-2-yl)-6-azaspiro[2.5]octane-6-carboxylate (I5b)

To a solution of tert-butyl 1,1-dichloro-2-(6-phenylpyridin-2-yl)-6-azaspiro[2.5]octane-6-carboxylate (I5a, 25 mg, 0.058 mmol) in ethanol (0.50 mL) and water (0.050 mL) was added zinc dust (40 mg, 0.61 mmol) and the reaction mixture was warmed to 110° C. and allowed to stir for 6.5 h. The reaction mixture was cooled to ambient temperature, filtered, and the filtrate was concentrated under reduced pressure. The residue was purified by silica gel chromatography, eluting with a gradient of hexanes:ethyl acetate:ethanol—100:0:0 to 50:37:13 to afford compound I5b. MS: m/z=365.3 [M+H].

Step C: 1-(6-Phenylpyridin-2-yl)-6-azaspiro[2.5]octane hydrochloride (I5)

To a solution of tert-butyl 1-(6-phenylpyridin-2-yl)-6-azaspiro[2.5]octane-6-carboxylate (I5b, 6.7 mg, 0.018 mmol) in 1,4-dioxane (0.40 mL) was added a solution of HCl in 1,4-dioxane (4 M, 0.046 mL, 0.184 mmol) and the reaction mixture allowed to stir for 18 h at ambient temperature. The reaction mixture was concentrated under a stream of nitrogen gas to afford compound I5 in sufficient purity for use in the next step. MS: m/z=265.2 [M+H].

Intermediate 6

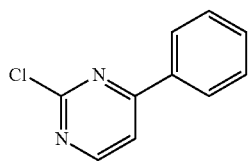 [SMILES: Clc1nccc(-c2ccccc2)n1]

2-Chloro-4-phenylpyrimidine (I6)

To a solution of 2,4-dichloropyrimidine (2.0 g, 13.4 mmol) in ethanol (10 mL) and toluene (20 mL) were added phenylboronic acid (1.64 g, 13.4 mmol), an aqueous solution of potassium carbonate (2 M, 10 mL, 20.0 mmol) and tetrakis(triphenylphosphine)palladium(0) (0.47 g, 0.40 mmol) and the reaction mixture was warmed to 100° C. and allowed to stir for 4 h. The reaction mixture was cooled to ambient temperature and water (30 mL) added and the resulting mixture extracted with ethyl acetate (3×20 mL). The combined organic extracts were washed with a saturated aqueous solution of sodium chloride (20 mL), dried (sodium sulfate), and filtered and the filtrate was concentrated under reduced pressure. The residue was purified by silica gel chromatography, eluting with a gradient of petroleum ether:ethyl acetate—100:0 to 85:15 to afford the title compound I6. MS: m/z=191.0 [M+H].

Intermediate 7

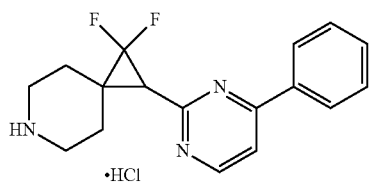 [SMILES: FC1(F)C(c2nccc(-c3ccccc3)n2)C12CCNCC2 ; Cl]

1,1-Difluoro-2-(4-phenylpyrimidin-2-yl)-6-azaspiro[2.5]octane hydrochloride (I7)

Step A: tert-Butyl-1,1-difluoro-2-(4-phenylpyrimidin-2-yl)-6-azaspiro[2.5]octane-6-carboxylate (I7a)

To a solution of tert-butyl 1,1-difluoro-2-(4,4,5,5-tetramethyl-1,3,2-dioxaborolan-2-yl)-6-azaspiro[2.5]octane-6-carboxylate (Intermediate 3, I3) (211 mg, 0.57 mmol) in tert-amyl alcohol (2.5 mL) were added 2-chloro-4-phenylpyrimidine (Intermediate 6, I6) (90 mg, 0.47 mmol), an aqueous solution of cesium carbonate (1.5 M, 0.94 mL, 1.4 mmol), and [(di(1-adamantyl)-butylphosphine)-2-(2'-amino-1,1'-biphenyl)]palladium(II) methanesulfonate (47.7 mg, 0.0655 mmol) and the reaction mixture was warmed to 100° C. and allowed to stir for 18 h. The reaction mixture was cooled to ambient temperature and water (5 mL) was added and the resulting mixture extracted with ethyl acetate (3×5 mL). The combined organic extracts were washed with a saturated aqueous solution of sodium chloride (10 mL), dried (sodium sulfate), and filtered and the filtrate was concentrated under reduced pressure. The residue was purified by silica gel chromatography, eluting with a gradient of petroleum ether:ethyl acetate—100:0 to 70:30 to afford compound I7a. MS: m/z=402.2 [M+H].

Step B: 1,1-Difluoro-2-(4-phenylpyrimidin-2-yl)-6-azaspiro[2.5]octane hydrochloride (I7)

To a vessel containing tert-butyl 1,1-difluoro-2-(4-phenylpyrimidin-2-yl)-6-azaspiro[2.5]octane-6-carboxylate (I7a) (110 mg, 0.27 mmol) was added a solution of hydrogen chloride in dioxane (4 M, 10 mL, 40 mmol) and the reaction mixture was allowed to stir for 1 h at ambient temperature. The reaction mixture was concentrated under reduced pressure to afford compound I7 in sufficient purity for use in the next step. MS: m/z=302.1 [M+H].

Intermediate 8

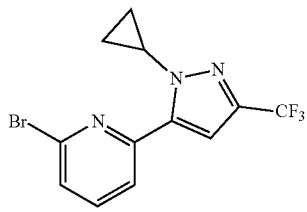

2-Bromo-6-[1-cyclopropyl-3-(trifluoromethyl)-1H-pyrazol-5-yl]pyridine (I8)

Step A: 1-(6-Bromopyridin-2-yl)-4,4,4-trifluorobutane-1,3-dione (I8a)

To a solution of 1-(6-bromopyridin-2-yl)ethanone (200 mg, 1.00 mmol) in methanol (2 mL) was added potassium tert-butoxide (224 mg, 2.00 mmol) and the reaction mixture was allowed to stir for 2 h at ambient temperature. Ethyl 2,2,2-trifluoroacetate (426 mg, 3.00 mmol) was added and the reaction mixture was allowed to stir for 2 h at ambient temperature. The reaction mixture was diluted with water (5 mL) and the resulting mixture adjusted to pH=4 with an aqueous solution of hydrogen chloride (1 M) and extracted with ethyl acetate (2×5 mL). The combined organic extracts were dried (sodium sulfate) and filtered and the filtrate was concentrated under reduced pressure to afford compound I8a in sufficient purity for use in the next step. $^1$H NMR (400 MHz, CD$_3$OD): δ 7.98-8.06 (m, 1H), 7.79-7.94 (m, 3H).

Step B: 2-Bromo-6-(1-cyclopropyl-3-(trifluoromethyl)-1H-pyrazol-5-yl)pyridine (I8)

To a solution of 1-(6-bromopyridin-2-yl)-4,4,4-trifluorobutane-1,3-dione (I8a, 200 mg, 0.68 mmol) in ethanol (5 mL) was added cyclopropylhydrazine (97 mg, 1.4 mmol) and the reaction mixture was allowed to stir for 1 h at ambient temperature. The reaction mixture was concentrated under reduced pressure and the residue was purified by silica gel chromatography, eluting petroleum ether:ethyl acetate—75:25 to afford compound I8. MS: m/z=331.9 [M+H].

Intermediate 9

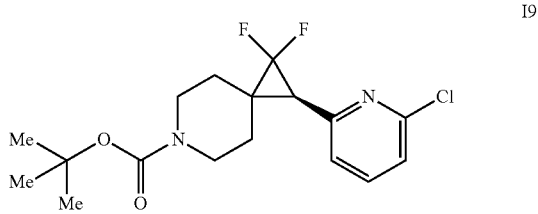 [SMILES: CC(C)(C)OC(=O)N1CCC2(CC1)[C@H](c1cccc(Cl)n1)C2(F)F]

tert-Butyl (2R)-2-(6-chloropyridin-2-yl)-1,1-difluoro-6-azaspiro[2.5]octane-6-carboxylate (I9)

Step A: 2-Chloro-6-(chloromethyl)pyridine (I9a)

To a solution of (6-chloropyridin-2-yl)methanol (30.0 g, 209 mmol) in dichloromethane (300 mL) at 0° C. was added thionyl chloride (30.5 mL, 418 mmol) dropwise and the reaction mixture was warmed to ambient temperature and allowed to stir for 3 h. The reaction mixture was concentrated under reduced pressure and water (500 mL) and a saturated aqueous solution of sodium bicarbonate (500 mL) were added. The resulting mixture was extracted with ethyl acetate (3×600 mL). The combined organic extracts were washed with a saturated aqueous solution of sodium chloride (300 mL), dried (sodium sulfate), and filtered and the filtrate was concentrated under reduced pressure to afford compound I9a in sufficient purity for use in the next step. $^1$H NMR (400 MHz, CDCl$_3$), δ 7.68 (t, J=7.7 Hz, 1H), 7.41 (d, J=7.5 Hz, 1H), 7.27 (d, J=7.9 Hz, 1H), 4.61 (s, 2H).

Step B: [(6-Chloropyridin-2-yl)methyl](triphenyl)phosphonium chloride (I9b)

To a solution of 2-chloro-6-(chloromethyl)pyridine (I9a, 32.0 g, 198 mmol) in toluene (100 mL) was added triphenylphosphine (51.8 g, 198 mmol) and the reaction mixture was warmed to 110° C. and allowed to stir for 16 h. The reaction mixture was cooled and filtered and the precipitate washed with toluene (3×20 mL) and dried under reduced pressure to afford compound I9b in sufficient purity for use in the next step. MS: m/z=388.1 [M].

Step C: tert-Butyl 4-((6-chloropyridin-2-yl)methylene)piperidine-1-carboxylate (I9c)

To a solution of [(6-chloropyridin-2-yl)methyl](triphenyl)phosphonium chloride (I9b, 20.0 g, 47.1 mmol) in tetrahydrofuran (200 mL) at 0° C. was added n-butyllithium (2.5 M, 37.7 mL, 94.3 mmol) dropwise. The reaction mixture was warmed to ambient temperature and allowed to stir for 30 min. A solution of tert-butyl 4-oxopiperidine-1-carboxylate (23.5 g, 118 mmol) in tetrahydrofuran (40 mL) was added and the mixture was allowed to stir for 16 h at ambient temperature. Water (200 mL) was added and the resulting mixture extracted with ethyl acetate (3×200 mL). The combined organic extracts were dried (sodium sulfate) and filtered and the filtrate was concentrated under reduced pressure. The residue was purified by silica gel chromatography, eluting with a gradient of petroleum ether:ethyl acetate—100:0 to 95:5 to afford compound I9c. MS: m/z=309.1 [M+H].

Step D: tert-Butyl (2R)-2-(6-chloropyridin-2-yl)-1,1-difluoro-6-azaspiro[2.5]octane-6-carboxylate (I9)

To a solution of tert-butyl 4-((6-chloropyridin-2-yl)methylene)piperidine-1-carboxylate (I9c, 7.4 g, 24 mmol) in tetrahydrofuran (40 mL) were added sodium iodide (7.18 g, 47.9 mmol) and trifluoromethyl)trimethylsilane (34.1 g, 240 mmol). The reaction mixture was warmed to 120° C. and allowed to stir for 16 h. The reaction mixture was cooled to ambient temperature and sodium iodide (8.74 g, 58.3 mmol) and trifluoromethyl)trimethylsilane (41.4 g, 291 mmol) were added. The reaction mixture was warmed to 120° C. and allowed to stir for 48 h. The reaction mixture was cooled and diluted with water (300 mL) and the resulting mixture extracted with ethyl acetate (3×300 mL). The combined organic extracts were dried (sodium sulfate) then filtered, the filtrate was evaporated under reduced pressure. The residue was purified by silica gel chromatography, eluting with a gradient of petroleum ether:ethyl acetate—100:0 to 90:10 to afford the racemic title compound. The mixture was resolved by SFC, utilizing a Chiralcel AD column and eluting with ethanol:carbon dioxide:ammonia hydroxide—15:85:0.1. The first major peak to elute was tert-butyl (2R)-2-(6-chloropyridin-2-yl)-1,1-difluoro-6-azaspiro[2.5]octane-6-carboxylate, the title compound I9 and the second major peak to elute was tert-butyl (2S)-2-(6-chloropyridin-2-yl)-1,1-difluoro-6-azaspiro[2.5]octane-6-carboxylate (I9s). MS: m/z=359.1 [M+H].

Example 1

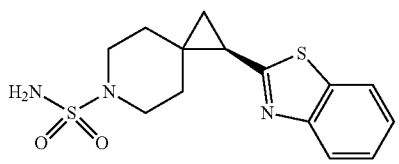

(1R)-1-(1,3-Benzothiazol-2-yl)-6-azaspiro[2.5]octane-6-sulfonamide (E1)

To a solution of (1R)-6-sulfamoyl-6-azaspiro[2.5]octane-1-carboxylic acid (Intermediate 1, I1) (100 mg, 0.427 mmol) in 1,4-dioxane (2.0 mL) was added 1,1'-carbonyldiimidazole (76 mg, 0.47 mmol) and the reaction mixture was allowed to stir for 1 h at ambient temperature. 2-Aminobenzenethiol (59 mg, 0.47 mmol) was added and the reaction mixture was warmed to 100° C. and allowed to stir for 17 h. The reaction mixture was cooled to ambient temperature and was concentrated under reduced pressure. The residue was purified by preparative HPLC, eluting with a gradient of acetonitrile:water:trifluoroacetic acid—5:95:0.1 to 55:45:0.1 to afford compound E1. MS: m/z=324.2 [M+H]. $^1$H NMR (500 MHz, DMSO-$d_6$) δ 8.02 (d, J=7.9 Hz, 1H), 7.90 (d, J=8.1 Hz, 1H), 7.46 (ddd, J=8.2, 7.3, 1.3 Hz, 1H), 7.38 (td, J=7.7, 7.3, 1.2 Hz, 1H), 6.70 (s, 2H), 3.15 (ddd, J=10.3, 5.9, 3.6 Hz, 1H), 3.03 (ddd, J=11.5, 8.4, 3.3 Hz, 1H), 2.96 (ddd, J=10.6, 6.2, 3.8 Hz, 1H), 2.67 (t, J=8.1 Hz, 1H), 2.56 (dd, J=8.2, 5.6 Hz, 1H), 1.72 (ddt, J=17.3, 8.4, 4.2 Hz, 2H), 1.63 (dtt, J=13.0, 6.6, 3.6 Hz, 2H), 1.46 (t, 1H), 1.25 (dd, J=8.2, 4.5 Hz, 1H).

Example 2

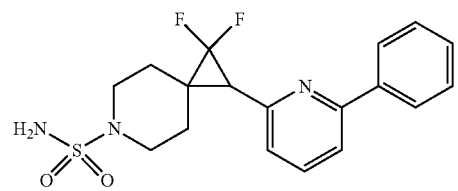

1,1-Difluoro-2-(6-phenylpyridin-2-yl)-6-azaspiro[2.5]octane-6-sulfonamide (E2)

To a solution of 1,1-difluoro-2-(6-phenylpyridin-2-yl)-6-azaspiro[2.5]octane hydrochloride (Intermediate 3, I3) (16.6 mg, 0.049 mmol) in 1,4-dioxane (0.30 mL) were added triethylamine (0.020 mL, 0.14 mmol) and sulfamide (13.2 mg, 0.137 mmol) and the reaction mixture was warmed to 100° C. and allowed to stir for 0.5 h. The reaction mixture was cooled to ambient temperature and concentrated under reduced pressure. The residue was purified by preparative HPLC, eluting with a gradient of acetonitrile:water:trifluoroacetic acid—10:90:0.1 to 90:10:0.1 to afford compound E2. MS: m/z=380.2 [M+H]. $^1$H NMR (CD$_3$OD) δ 8.01 (d, J=7.2 Hz, 2H), 7.81 (t, J=7.8 Hz, 1H), 7.75 (d, J=7.8 Hz, 1H), 7.47 (t, J=7.5 Hz, 2H), 7.42 (t, J=7.3 Hz, 1H), 7.30 (d, J=7.6 Hz, 1H), 3.46-3.38 (m, 1H), 3.24-3.13 (m, 2H), 3.01-2.93 (m, 1H), 2.89 (d, J=14.2 Hz, 1H), 2.07-1.94 (m, 2H), 1.96-1.88 (m, 1H), 1.85-1.75 (m, 1H).

Example 3

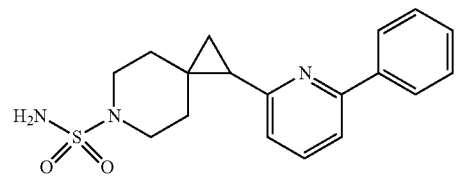

1-(6-Phenylpyridin-2-yl)-6-azaspiro[2.5]octane-6-sulfonamide (E3)

To a solution of 1-(6-phenylpyridin-2-yl)-6-azaspiro[2.5]octane hydrochloride (Intermediate 5, I5) (5.7 mg, 0.017 mmol) in 1,4-dioxane (0.30 mL) were added triethylamine (0.016 mL, 0.11 mmol) and sulfamide (10.4 mg, 0.108 mmol) and the reaction mixture was warmed to 100° C. and allowed to stir for 3 h. The reaction mixture was cooled to ambient temperature and concentrated under reduced pressure. The residue was purified by silica gel chromatography, eluting with a gradient of hexanes:ethyl acetate—100:0 to 48:52 to afford compound E3. MS: m/z=344.3 [M+H]. $^1$H NMR (CD$_3$OD) δ 7.99 (d, J=7.2 Hz, 2H), 7.71 (t, J=7.8 Hz, 1H), 7.62 (d, J=7.5 Hz, 1H), 7.45 (t, J=7.5 Hz, 2H), 7.39 (t, J=7.3 Hz, 1H), 7.29 (d, J=7.6 Hz, 1H), 3.29-3.27 (m, 1H), 3.26-3.19 (m, 1H), 3.06-3.00 (m, 1H), 2.80-2.72 (m, 1H), 2.21 (dd, J=8.2, 5.8 Hz, 1H), 1.80-1.71 (m, 2H), 1.70-1.61 (m, 2H), 1.58 (t, J=5.1 Hz, 1H), 1.00 (dd, J=8.3, 4.6 Hz, 1H).

Example 4

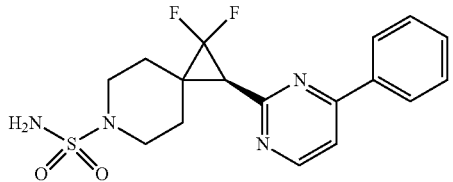

(2R)-1,1-Difluoro-2-(4-phenylpyrimidin-2-yl)-6-azaspiro[2.5]octane-6-sulfonamide (E4)

To a solution of 1,1-difluoro-2-(4-phenylpyrimidin-2-yl)-6-azaspiro[2.5]octane hydrochloride (Intermediate 7, I7) (85 mg, 0.25 mmol) in 1,4-dioxane (3 mL) were added triethylamine (0.11 mL, 0.76 mmol) and sulfamide (36.3 mg, 0.38 mmol) and the reaction mixture was warmed to 95° C. and allowed to stir for 16 h. The reaction mixture was cooled to ambient temperature and water (5 mL) was added. The resulting mixture was extracted with ethyl acetate (3×5 mL). The combined organic extracts were washed with a saturated aqueous solution of sodium chloride (10 mL), dried (sodium sulfate), filtered, and the filtrate was concentrated under reduced pressure. The residue was purified by silica gel chromatography, eluting with a gradient of petroleum ether:ethyl acetate—100:0 to 60:40 to afford the racemic title compound. The mixture was resolved by SFC, utilizing a Chiralcel AD column, eluting with ethanol:carbon dioxide:ammonium hydroxide—35:65:0.1. The first major peak to elute (2R)-1,1-difluoro-2-{2-[4-fluoro-2-(trifluoromethyl)phenyl]-1,3-oxazol-4-yl}-6-azaspiro[2.5]octane-6-sulfonamide, the title compound E4 and the second major peak to elute was (2S)-1,1-difluoro-2-{2-[4-fluoro-2-(trifluoromethyl)phenyl]-1,3-oxazol-4-yl}-6-azaspiro[2.5]octane-6-sulfonamide (E4s). MS: m/z=381.0 [M+H]. $^1$H NMR (400 MHz, CDCl$_3$): δ 8.71 (d, J=5.3 Hz, 1H), 8.05-8.12 (m, 2H), 7.61 (d, J=5.3 Hz, 1H), 7.50-7.56 (m, 3H), 4.35 (s, 2H), 3.43-3.51 (m, 1H), 3.20-3.31 (m, 2H), 3.09-3.18 (m, 1H), 2.92 (d, J=14.1 Hz, 1H), 2.20-2.36 (m, 2H), 1.96-2.11 (m, 2H)

Example 5

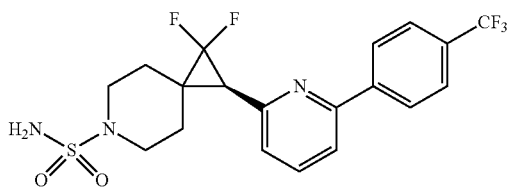

(2R)-1,1-Difluoro-2-{6-[4-(trifluoromethyl)phenyl]pyridin-2-yl}-6-azaspiro[2.5]octane-6-sulfonamide (E5)

Step A: tert-Butyl (2R)-2-(6-chloropyridin-2-yl)-1,1-difluoro-6-azaspiro[2.5]octane-6-carboxylate (E5a)

To a solution of tert-butyl (2R)-2-(6-chloropyridin-2-yl)-1,1-difluoro-6-azaspiro[2.5]octane-6-carboxylate (Intermediate 9, I9) (50 mg, 0.14 mmol) in 1,4-dioxane (3 mL) and water (1 mL) were added 4,4,5,5-tetramethyl-2-(4-(trifluoromethyl)phenyl)-1,3,2-dioxaborolane (56.9 mg, 0.209 mmol), [1,1'-bis(diphenylphosphino)ferrocene]palladium(II) dichloride (10 mg, 0.014 mmol), and potassium carbonate (39 mg, 0.28 mmol) and the reaction mixture was warmed to 90° C. and allowed to stir for 30 min. The reaction mixture was cooled to ambient temperature and water (50 mL) was added. The resulting mixture was extracted with ethyl acetate (3×20 mL). The combined organic extracts were washed with a saturated aqueous solution of sodium chloride (20 mL), dried (sodium sulfate), filtered, and the filtrate was concentrated under reduced pressure. The residue was purified by silica gel chromatography, eluting with a gradient of petroleum ether:ethyl acetate—100:0:0 to 80:20 to afford compound E5a. MS: m/z=469.0 [M+H].

Step B: 1,1-Difluoro-2-{6-[4-(trifluoromethyl)phenyl]pyridin-2-yl}-6-azaspiro[2.5]octane hydrochloride (E5b)

To a flask containing tert-butyl (2R)-2-(6-chloropyridin-2-yl)-1,1-difluoro-6-azaspiro[2.5]octane-6-carboxylate (E5a, 52 mg, 0.11 mmol) was added a solution of HCl in 1,4-dioxane (4 M, 5 mL) and the reaction mixture was allowed to stir for 30 min at ambient temperature. The reaction mixture was concentrated under reduced pressure to afford compound E5b in sufficient purity for use in the next step. MS: m/z=369.0 [M+H].

Step C: (2R)-1,1-Difluoro-2-{6-[4-(trifluoromethyl)phenyl]pyridin-2-yl}-6-azaspiro[2.5]octane-6-sulfonamide (E5)

To a solution of 1,1-difluoro-2-{6-[4-(trifluoromethyl)phenyl]pyridin-2-yl}-6-azaspiro[2.5]octane hydrochloride (E5b, 40 mg, 0.11 mmol) in 1,4-dioxane (5 mL) were added triethylamine (0.030 mL, 0.22 mmol) and sulfamide (52.2 mg, 0.543 mmol) and the reaction mixture was warmed to 100° C. and allowed to stir for 16 h. The reaction mixture was cooled to ambient temperature and water (80 mL) was added. The resulting mixture was extracted with ethyl acetate (3×30 mL). The combined organic extracts were washed with a saturated aqueous solution of sodium chloride (30 mL), dried (sodium sulfate), filtered, and the filtrate was concentrated under reduced pressure. The residue was purified by HPLC, eluting with a gradient of acetonitrile:water:trifluoroacetic acid—45:55:0.1 to 75:25:0.1 to afford compound E5. MS: m/z=447.9 [M+H]. $^1$H NMR (400 MHz, CD$_3$OD): δ 8.22 (s, 2H), 7.84-7.87 (m, 2H), 7.77 (d, J=8.2 Hz, 2H), 7.35-7.40 (m, 1H), 3.37-3.45 (m, 1H), 3.11-3.27 (m, 2H), 2.88-3.03 (m, 2H), 1.78-2.04 (m, 4H).

Example 6

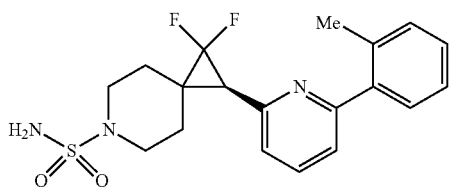

(2R)-1,1-Difluoro-2-[6-(2-methylphenyl)pyridin-2-yl]-6-azaspiro[2.5]octane-6-sulfonamide (E6)

Following analogous procedures to those described in Example 5, but using 4,4,5,5-tetramethyl-2-(o-tolyl)-1,3,2-dioxaborolane in place of 4,4,5,5-tetramethyl-2-(4-(trifluoromethyl)phenyl)-1,3,2-dioxaborolane, the title compound E6 was obtained. MS: m/z=393.9 [M+H]. $^1$H NMR (400 MHz, CD$_3$OD). δ 7.85 (t, J=7.8 Hz, 1H), 7.36 (s, 2H), 7.31 (br s, 4H), 3.41-3.50 (m, 1H), 3.16-3.25 (m, 1H), 2.98-3.09 (m, 1H), 2.81-2.92 (m, 2H), 2.29 (s, 3H), 2.04-2.14 (m, 1H), 1.79-1.95 (m, 2H), 1.59-1.69 (m, 1H).

TABLE EX-A

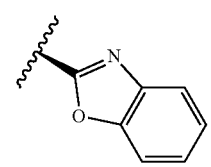

| Example | X | R | MS [M + H] |
|---|---|---|---|
| A1 | F | 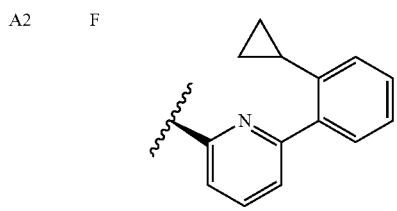 | 380.0 |
| A2 | F | 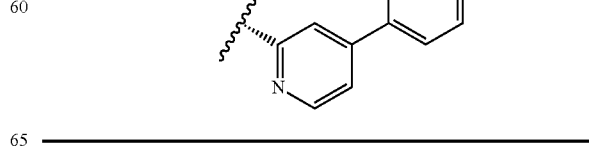 | 420.0 |

TABLE EX-A-continued

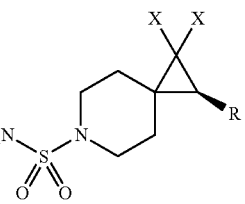

| Example | X | R | MS [M + H] |
|---|---|---|---|
| A3 | F | 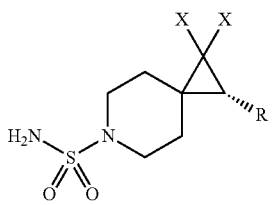 | 344.0 |

TABLE EX-B

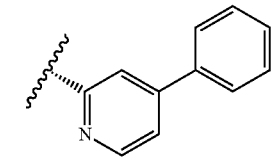

| Example | X | R | MS [M + H] |
|---|---|---|---|
| B1 | F | (4-CF$_3$-phenyl-pyridinyl) | 447.9 |
| B2 | F | (phenyl-pyridinyl) | 380.0 |

TABLE EX-C

| Example | X¹ | X² | W | R | Stereochemistry Comment | MS [M + H] |
|---|---|---|---|---|---|---|
| C1 | F | F | H$_2$N-S(O)$_2$- | 3'-CF$_3$-biphenyl-3-yl | Racemic | 447.0 |
| C2 | F | F | H$_2$N-S(O)$_2$- | 2-(3-cyclopropylisoxazol-4-yl)pyridin-6-yl | Single isomer | 411.4 |
| C3 | F | F | H$_2$N-S(O)$_2$- | 2-(3-cyclopropylisoxazol-4-yl)pyridin-6-yl | Single isomer | 411.4 |

Electrophysiology EC$_{50}$ values for selected compounds of the present invention in the automated patch-clamp electrophysiology functional assay (Assay A) are provided in the table below:

| Example | α7 nAChR Potency |
|---|---|
| 1 | C |
| 2 | C |
| 3 | C |
| 4 | C |
| 5 | B |
| 6 | C |
| A1 | B |
| A2 | C |
| A3 | C |
| B1 | C |
| B2 | C |
| C1 | B |
| C2 | C |
| C3 | C |
| C4 | C |

Potency data for selected compounds of the present invention in the automated patch-clamp electrophysiology functional assay (Assay A) are represented in the table below:

| Example | α7 nAChR EC$_{50}$ (nM) |
|---|---|
| 1 | 930 |
| 2 | 1600 |
| 3 | 3000 |
| 4 | 1900 |
| 5 | 340 |
| 6 | 2200 |
| A1 | 190 |
| A2 | 830 |
| A3 | 1000 |
| B1 | 4400 |
| B2 | 1700 |
| C1 | 430 |
| C2 | 850 |
| C4 | 1600 |

The utility of the compounds in accordance with the present invention as positive allosteric modulators of α7 nicotinic acetylcholine receptor activity may be demonstrated by methodology known in the art. Direct activation of α7 (agonism), and potentiation of acetylcholine-evoked α7 currents was determined as follows:

Automated Patch-Clamp Electrophysiology Functional Assay (Assay A)

Automated patch-clamp electrophysiology was performed using the IonFlux HT (Fluxion Biosciences Inc., San Francisco, CA) in the whole-cell, population patch configuration. Test compounds were assessed for their ability to modulate the function of the α7 nicotinic acetylcholine receptor both in the presence, and in the absence of the natural α7 agonist acetylcholine. A HEK cell line stably expressing both human RIC-3 and human α7 (PrecisION hnAChR α7/RIC-3, Eurofins Pharma, St. Charles, MO) was cultured in 175 cm² triple-layer tissue culture flasks to no more than 90% confluency in DMEM/F-12 growth media supplemented with 10% heat-inactivated fetal bovine serum, 1% non-essential amino acids, 0.625 µg/mL Puromycin, and 400 µg/mL Geneticin. Immediately prior to assay, cells were detached by first aspirating growth media, rinsing with Dulbecco's phosphate buffered saline, and then adding 10 mL of Accutase (Innovative Cell Technologies, San Diego, CA) to the flask and then incubating at 37° C. for 5 minutes. Detached cells were then recovered by the addition of 40 mL of CHO-serum-free media supplemented with 25 mM HEPES, and rocked gently in a 50 mL conical tube for 20 minutes prior to patch-clamp assay. After recovery, cells were pelleted by centrifugation at 1,000 RPM for 1 minute in a compact bench top centrifuge; recovery media was aspirated and cells were resuspended in external recording solution (150 mM NaCl, 5 mM KCl, 2 mM $CaCl_2$), 1 mM $MgCl_2$, 10 mM HEPES, 12 mM dextrose) to a density of $5.0\times10^6$ cells/mL. The cell suspension was added to the cell inlet wells on an IonFlux HT population patch plate which had previously been rinsed and primed with deionized $H_2O$. Test compounds were serially diluted in DMSO and then resuspended to the final test concentration in external recording solution, with, or without 40 µM acetylcholine added to the external recording solution; test compounds were then transferred to the IonFlux HT population patch plate. Internal recording solution (110 mM $TrisPO_4$, 28 mM TrisBase, 0.1 mM $CaCl_2$), 2 mM $MgCl_2$, 11 mM EGTA, 4 mM MgATP) was added to the internal recording solution inlet wells on the IonFlux HT patch plate previously loaded with cells and test compounds, and the plate loaded into the IonFlux HT instrument. A protocol was executed on the IonFlux HT to trap the cells, break into the cells, and establish the whole-cell recording configuration; cells were voltage-clamped at a holding potential of −60 mV for the duration of the experiment, all experiments were conducted at room temperature, and the IonFlux HT injection pressure was 8 psi for solution applications. Upon establishing the whole-cell configuration, external recording solution was perfused into the recording chambers for 120 seconds and then 40 µM acetylcholine was applied for 1 second and immediately washed off with external recording solution for 60 seconds. The 40 µM acetylcholine-evoked α7 current served as the current response to which subsequent test compound effects, in the presence, or in the absence of 40 µM acetylcholine would be quantified relative to. Next, test compounds were evaluated at multiple concentrations for their ability to induce, or modulate α7 current responses; three concentrations of test compound were evaluated in ascending dose fashion per recording. To assess test compound agonist activity, test compound diluted in external recording solution was applied starting from the lowest concentration of test compound being tested in the concentration series, for 58 seconds; the first 20 seconds of the 58 second compound application period coincided with a data collection sweep which was 20 seconds in duration, and collected at a rate of 5,000 samples/second. To assess test compound positive allosteric modulator activity, immediately following the 58 second test compound only application period, the same concentration of test compound, diluted in external recording solution containing 40 µM acetylcholine was applied for 1 second; in this way, the test compound and the natural receptor agonist acetylcholine were co-applied, and potentiating effects of test compounds observed. The 1 second application of test compound diluted in external solution containing 40 µM acetylcholine coincided with a data collection sweep which was 20 seconds in duration, and collected at a rate of 5,000 samples/second, after which, external recording solution only was applied for 42 seconds. Following this 42 second wash with external recording solution only, the next highest concentration of the test compound in the concentration series was applied in the absence and then in the presence of acetylcholine as previously described, and data collected as previously described. After test compound agonist, and positive allosteric modulator activity were assessed at three ascending concentrations, the experiment was terminated and leak subtraction performed using the IonFlux HT data analysis software. Peak current amplitudes and the area under the curve (AUC) were both quantified for each current sweep using proprietary software and test compound effects where quantified as follows.

Test compound agonist activity was calculated as:

% Agonism=$(Y/X)\times100$

Test compound potentiator activity was calculated as:

% Potentiation=$[(Z/X)\times100]-100$

X=Peak current amplitude (or AUC) evoked by 40 µM acetylcholine

Y=Peak current amplitude (or AUC) evoked by test compound diluted in external recording solution Z=Peak current amplitude (or AUC) evoked by test compound diluted in external recording solution containing 40 µM acetylcholine As such, test compounds which evoked the same current amplitude as 40 µM acetylcholine alone would exhibit a calculated % Agonism of 100%. Test compounds co-applied with 40 µM acetylcholine which evoked a current amplitude 2× the current evoked from 40 µM acetylcholine alone would exhibit a calculated % Potentiation of 100%, whereas test compounds co-applied with 40 µM acetylcholine which evoked the same current amplitude as 40 µM acetylcholine alone would be characterized as exhibiting no potentiation.

Agonist and potentiation data, derived by peak current amplitude or area under the curve (AUC) were graphed and fit using a 4-parameter logistic fit based on the Levenberg-Marquardt algorithm where $y=A+((B-A)/(1+((C/x)^D)))$ where:

A=Minimum

B=Maximum

C=$EC_{50}$

D=Slope x=test compound concentration y=% Agonism or % Potentiation

It will be appreciated that various of the above-discussed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:
1. A compound having the formula I:

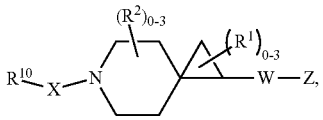

or a pharmaceutically acceptable salt thereof, wherein:
W is aryl or 6-14 membered heteroaryl ring, wherein W is substituted with 0, 1, 2, or 3 $R^3$ substituents each independently selected from OH, oxo, $NR^6R^7$, CN, $O(C_1\text{-}C_6)$alkyl, halogen, $(C_1\text{-}C_6)$haloalkyl, aminoalkyl, hydroxyalkyl, alkyl, alkenyl, alkynyl, cycloalkyl, aryl, heteroaryl, and heterocyclyl, wherein each $R^3$ is independently substituted with 0, 1, 2, or 3 $R^5$;
Z is hydrogen, $(C_1\text{-}C_6)$alkyl, aryl, or heteroaryl, wherein Z is substituted with 0, 1, 2, or 3 $R^4$ substituents each independently selected from OH, oxo, $NR^6R^7$, CN, $O(C_1\text{-}C_6)$alkyl, halogen, $(C_1\text{-}C_6)$haloalkyl, aminoalkyl, hydroxyalkyl, alkyl, alkenyl, alkynyl, cycloalkyl, aryl, heteroaryl, and heterocyclyl, wherein each $R^4$ is independently substituted with 0, 1, 2, or 3 $R^5$;
—X—$R^{10}$ is

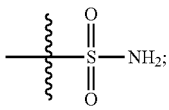

each $R^2$ is independently halogen, $(C_1\text{-}C_6)$alkyl, $O(C_1\text{-}C_6)$alkyl, cycloalkyl, or $(C_1\text{-}C_6)$haloalkyl; or two $R^2$ when both are $(C_1\text{-}C_4)$alkyl and are attached to the same carbon atom, may join to form a cyclopropyl, cyclobutyl, or cyclopentyl ring or, two $R^2$ when both are $(C_1\text{-}C_4)$alkyl and are attached to different carbon atoms, may join to form a bridged ring, wherein said cyclopropyl, cyclobutyl, cyclopentyl or bridged ring may be optionally substituted with 0, 1, 2, or 3 substituents independently selected from OH, halogen, or $(C_1\text{-}C_4)$alkyl;
each $R^1$ is independently halogen, $(C_1\text{-}C_6)$alkyl, $O(C_1\text{-}C_6)$alkyl, or $(C_1\text{-}C_6)$haloalkyl; or, two $R^1$ when both are $(C_1\text{-}C_4)$alkyl may join to form a cyclopropyl, cyclobutyl, cyclopentyl, or cyclohexyl ring and said ring is substituted with 0, 1, 2, or 3 substituents independently selected from OH, halogen, or $(C_1\text{-}C_4)$ alkyl;
each $R^5$ is independently selected from halogen, OH, oxo, $CF_3$, $OCF_3$, CN, $(C_1\text{-}C_6)$alkyl, $O(C_1\text{-}C_6)$alkyl, $S(C_1\text{-}C_4)$alkyl, C=$O(C_1\text{-}C_4)$alkyl, $NR^8R^9$, (C=O)$NR^6R^7$, (C=O)$OR^6$, $(C_2\text{-}C_4)$alkenyl, $(C_2\text{-}C_4)$alkynyl, $(C_3\text{-}C_6)$cycloalkyl, $O(C_3\text{-}C_6)$cycloalkyl, C=$O(C_3\text{-}C_6)$cycloalkyl, aryl, O-aryl, heteroaryl and heterocyclyl;
each $R^6$ is independently hydrogen or $(C_1\text{-}C_4)$alkyl;
each $R^7$ is independently hydrogen or $(C_1\text{-}C_4)$alkyl;
each $R^8$ is independently $(C_1\text{-}C_4)$alkyl, heterocyclyl, cycloalkyl, heteroaryl, aryl, or (C=O)$R^6$, each substituted with 0, 1, 2, or 3 substituents independently selected from halogen, $(C_1\text{-}C_4)$alkyl, and OH; and
each $R^9$ is independently $(C_1\text{-}C_4)$alkyl, heterocyclyl, cycloalkyl, heteroaryl, aryl, or (C=O)$R^6$,
each substituted with 0, 1, 2, or 3 substituents independently selected from halogen, $(C_1\text{-}C_4)$alkyl, and OH.

2. The compound according to claim 1, or a pharmaceutically acceptable salt thereof, wherein $R^1$ is halogen, or $(C_1\text{-}C_4)$alkyl.

3. The compound according to claim 2, or a pharmaceutically acceptable salt thereof, wherein $R^2$ is halogen, or $(C_1\text{-}C_4)$alkyl.

4. The compound according to claim 3, or a pharmaceutically acceptable salt thereof, wherein W is selected from phenyl, napthyl, benzimidazolyl, benzimidazolonyl, benzofuranyl, benzofurazanyl, benzopyrazolyl, benzotriazolyl, benzothiophenyl, benzoxazolyl, benzothiazolyl, carbazolyl, carbolinyl, cinnolinyl, indolinyl, indolyl, indolazinyl, indazolyl, isobenzofuranyl, isoindolyl, isoquinolyl, naphthpyridinyl, pyrazinyl, pyridazinyl, pyridopyridinyl, pyridazinyl, pyridyl, pyrimidyl, quinazolinyl, quinolyl, quinoxalinyl, tetrazolopyridyl, dihydrobenzoimidazolyl, dihydrobenzofuranyl, dihydrobenzothiophenyl, dihydrobenzoxazolyl, dihydroindolyl, dihydroquinolinyl, tetrahydrobenzoxazolyl, oxazolopyridinyl, imidazopyridazinyl, dihydrocyclopentaoxazolyl, pyrazolopyridinyl, thienopyridinyl, tetrahydropyrazolopyridinyl, furopyridinyl, dihydropyridooxazinyl, dihydrobenzothiazolyl, tetrahydrobenzothiazolyl, thiazolopyridinyl, pyridopyrimidinyl, phthalazinyl, pyridopyrazinyl, thienoxazolyl, and thienothiazolyl, wherein W is substituted with 0, 1, 2, or 3 $R^3$ substituents each independently selected from OH, oxo, $NR^6R^7$, CN, $O(C_1\text{-}C_6)$alkyl, halogen, $(C_1\text{-}C_6)$haloalkyl, aminoalkyl, hydroxyalkyl, alkyl, alkenyl, alkynyl, cycloalkyl, aryl, heteroaryl, and heterocyclyl, wherein each $R^3$ is independently substituted with 0, 1, 2, or 3 $R^5$.

5. The compound according to claim 4, or a pharmaceutically acceptable salt thereof, wherein Z is hydrogen, aryl, or heteroaryl, wherein Z is substituted with 0, 1, 2, or 3 $R^4$ substituents each independently selected from OH, OXO, $NR^6R^7$, CN, $O(C_1\text{-}C_6)$alkyl, halogen, $(C_1\text{-}C_6)$haloalkyl, aminoalkyl, hydroxyalkyl, alkyl, alkenyl, alkynyl, cycloalkyl, aryl, heteroaryl, and heterocyclyl, wherein each $R^4$ is independently substituted with 0, 1, 2, or 3 $R^5$.

6. The compound according to claim 5, or a pharmaceutically acceptable salt thereof, wherein each $R^5$ is independently selected from halogen, OH, oxo, $CF_3$, $OCF_3$, methyl, ethyl, difluoromethyl, and trifluoromethyl.

7. The compound according to claim 6, or a pharmaceutically acceptable salt thereof, wherein each $R^6$ is hydrogen.

8. The compound according to claim 7, or a pharmaceutically acceptable salt thereof, wherein each $R^7$ is hydrogen.

9. The compound according to claim 8, or a pharmaceutically acceptable salt thereof, wherein each $R^8$ is independently selected from $(C_1\text{-}C_4)$alkyl, heterocyclyl, cycloalkyl, heteroaryl, aryl, and (C=O)$R^6$, each $R^8$ is substituted with 0, 1, 2, or 3 substituents independently selected from halogen, $(C_1\text{-}C_4)$alkyl, and OH.

10. The compound according to claim 9, or a pharmaceutically acceptable salt thereof, wherein each $R^9$ is independently $(C_1\text{-}C_4)$alkyl or (C=O)$R^6$, each $R^9$ is substituted with 0, 1, 2, or 3 substituents independently selected from halogen, $(C_1\text{-}C_4)$alkyl, and OH.

11. The compound of claim 1 which is:
1-(1,3-Benzothiazol-2-yl)-6-azaspiro[2.5]octane-6-sulfonamide;
1,1-Difluoro-2-(6-phenylpyridin-2-yl)-6-azaspiro[2.5]octane-6-sulfonamide;
1-(6-Phenylpyridin-2-yl)-6-azaspiro[2.5]octane-6-sulfonamide;

1,1-Difluoro-2-(4-phenylpyrimidin-2-yl)-6-azaspiro[2.5]octane-6-sulfonamide;

1,1-Difluoro-2-{6-[4-(trifluoromethyl)phenyl]pyridin-2-yl}-6-azaspiro[2.5]octane-6-sulfonamide;

1,1-Difluoro-2-[6-(2-methylphenyl)pyridin-2-yl]-6-azaspiro[2.5]octane-6-sulfonamide;

1,1-Difluoro-2-(4-phenylpyridin-2-yl)-6-azaspiro[2.5]octane-6-sulfonamide;

2-[6-(2-Cyclopropylphenyl)pyridin-2-yl]-1,1-difluoro-6-azaspiro[2.5]octane-6-sulfonamide;

2-(1,3-Benzoxazol-2-yl)-1,1-difluoro-6-azaspiro[2.5]octane-6-sulfonamide;

1,1-Difluoro-2-{6-[4-(trifluoromethyl)phenyl]pyridin-2-yl}-6-azaspiro[2.5]octane-6-sulfonamide;

1,1-Difluoro-2-(4-phenylpyridin-2-yl)-6-azaspiro[2.5]octane-6-sulfonamide;

1,1-Difluoro-2-[3'-(trifluoromethyl) biphenyl-3-yl]-6-azaspiro[2.5]octane-6-sulfonamide;

2-[6-(3-Cyclopropylisoxazol-4-yl) pyridin-2-yl]-1,1-difluoro-6-azaspiro[2.5]octane-6-sulfonamide;

2-[6-(3-Cyclopropylisoxazol-4-yl) pyridin-2-yl]-1,1-difluoro-6-azaspiro[2.5]octane-6-sulfonamide;

2-{6-[1-Cyclopropyl-3-(trifluoromethyl)-1H-pyrazol-5-yl]pyridin-2-yl}-1,1-difluoro-6-azaspiro[2.5]octane-6-sulfonamide; or a pharmaceutically acceptable salt thereof.

12. The compound of claim 11 a compound, which is:

(1R)-1-(1,3-Benzothiazol-2-yl)-6-azaspiro[2.5]octane-6-sulfonamide;

1,1-Difluoro-2-(6-phenylpyridin-2-yl)-6-azaspiro[2.5]octane-6-sulfonamide;

1-(6-Phenylpyridin-2-yl)-6-azaspiro[2.5]octane-6-sulfonamide;

(2R)-1,1-Difluoro-2-(4-phenylpyrimidin-2-yl)-6-azaspiro[2.5]octane-6-sulfonamide;

(2R)-1,1-Difluoro-2-{6-[4-(trifluoromethyl)phenyl]pyridin-2-yl}-6-azaspiro[2.5]octane-6-sulfonamide;

(2R)-1,1-Difluoro-2-[6-(2-methylphenyl)pyridin-2-yl]-6-azaspiro[2.5]octane-6-sulfonamide;

(2R)-1,1-Difluoro-2-(4-phenylpyridin-2-yl)-6-azaspiro[2.5]octane-6-sulfonamide;

(2R)-2-[6-(2-Cyclopropylphenyl)pyridin-2-yl]-1,1-difluoro-6-azaspiro[2.5]octane-6-sulfonamide;

(2R)-2-(1,3-Benzoxazol-2-yl)-1,1-difluoro-6-azaspiro[2.5]octane-6-sulfonamide;

(2S)-1,1-Difluoro-2-{6-[4-(trifluoromethyl)phenyl]pyridin-2-yl}-6-azaspiro[2.5]octane-6-sulfonamide;

(2S)-1,1-Difluoro-2-(4-phenylpyridin-2-yl)-6-azaspiro[2.5]octane-6-sulfonamide;

1,1-Difluoro-2-[3'-(trifluoromethyl) biphenyl-3-yl]-6-azaspiro[2.5]octane-6-sulfonamide;

2-[6-(3-Cyclopropylisoxazol-4-yl) pyridin-2-yl]-1,1-difluoro-6-azaspiro[2.5]octane-6-sulfonamide;

2-[6-(3-Cyclopropylisoxazol-4-yl) pyridin-2-yl]-1,1-difluoro-6-azaspiro[2.5]octane-6-sulfonamide; or 2-{6-[1-Cyclopropyl-3-(trifluoromethyl)-1H-pyrazol-5-yl]pyridin-2-yl}-1,1-difluoro-6-azaspiro[2.5]octane-6-sulfonamide; or a pharmaceutically acceptable salt thereof.

13. A pharmaceutical composition comprising (i) a pharmaceutically acceptable carrier and (ii) a compound according to claim 1 or a pharmaceutically acceptable salt thereof.

14. The pharmaceutical composition of claim 13, further comprising a second therapeutic agent selected from the group consisting of acetylcholinesterase inhibitors; NMDA receptor antagonists; antipsychotics; MAO-B inhibitors; and levodopa.

15. A method of treating a patient with cognitive impairments associated with Alzheimer's disease, Parkinson's disease, and schizophrenia, the method comprising administering to the patient the compound according to claim 1, or a pharmaceutically acceptable salt thereof, in an amount effective to treat the patient.

* * * * *